United States Patent [19]
Fischer et al.

[11] Patent Number: 5,925,984
[45] Date of Patent: *Jul. 20, 1999

[54] CIRCUIT ARRANGEMENT HAVING LC PARALLEL TUNED DRIVE CIRCUITRY

[75] Inventors: Klaus Fischer; Harald Schmitt, both of München; Ludwig Reiser, Gersthofen; Peter Haeussinger, Augsburg; Walter Hirschmann, Munich, all of Germany

[73] Assignee: Patent-Treuhand-Gesellschaft fuer elektrische Gluehlampen mbH, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/764,545

[22] Filed: Dec. 12, 1996

[30] Foreign Application Priority Data

Dec. 22, 1995 [DE] Germany .................. 195 48 506

[51] Int. Cl.$^6$ .................................. H05B 37/02
[52] U.S. Cl. .................. 315/219; 315/209 R; 315/224
[58] Field of Search ........... 331/113 A; 315/209 R, 315/224, 244, 219, 223; 363/37, 124, 18

[56] References Cited

U.S. PATENT DOCUMENTS

| 5,349,270 | 9/1994 | Roll et al. | 315/209 R |
| 5,424,615 | 6/1995 | Kang | 315/219 |
| 5,424,616 | 6/1995 | Reijnaerts | 315/248 |
| 5,438,243 | 8/1995 | Kong | 315/219 |
| 5,559,405 | 9/1996 | Otohamiprodjo | 315/209 R |

OTHER PUBLICATIONS

Elektronik–schaltungen, Hirschmann, pp. 148–151, 1982.

*Primary Examiner*—Arnold Kinkead
*Attorney, Agent, or Firm*—Carlo S. Bessone

[57] ABSTRACT

The invention relates to a circuit arrangement for operating a lamp (EL), in particular a low-pressure discharge lamp, with a load circuit which has at least one inductor (L2) and at least one capacitor (C7, C8, C9), and with an invertor which may be configured as a half-bridge arrangement with two switching elements (T1, T2), and with a drive circuit (AS) for driving the switching elements (T1, T2). The invention provides that the drive circuit (AS) has at least one LC parallel tuned circuit (L3C3, L4C4). The circuit arrangement according to the invention can be produced without separate cost-intensive wound parts.

21 Claims, 17 Drawing Sheets

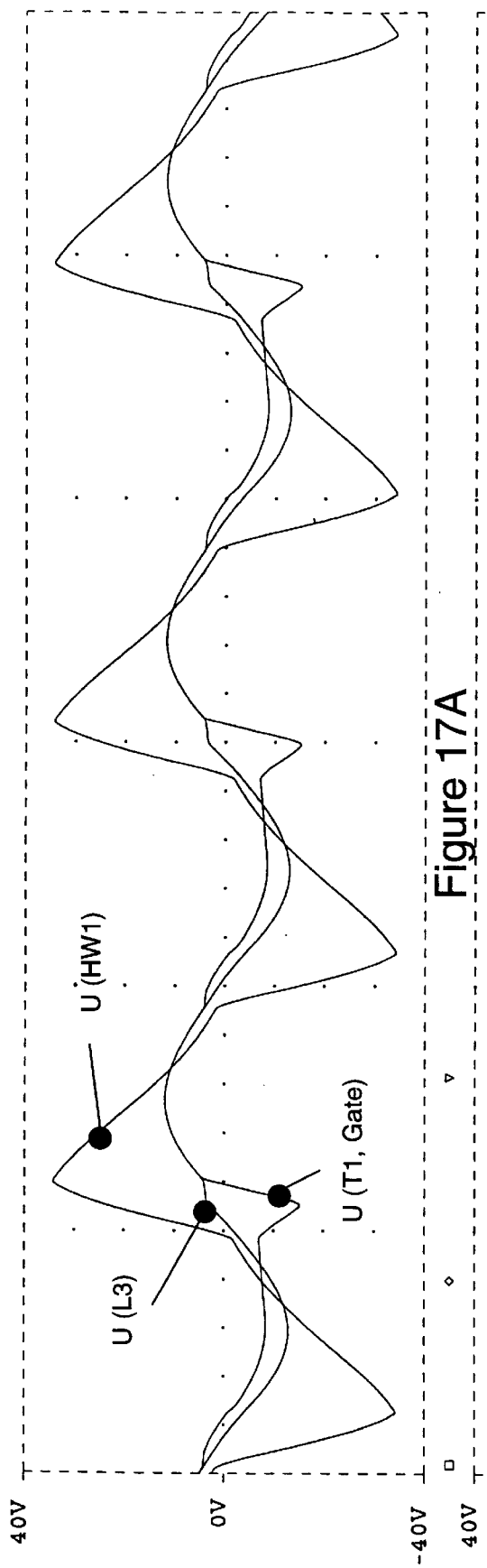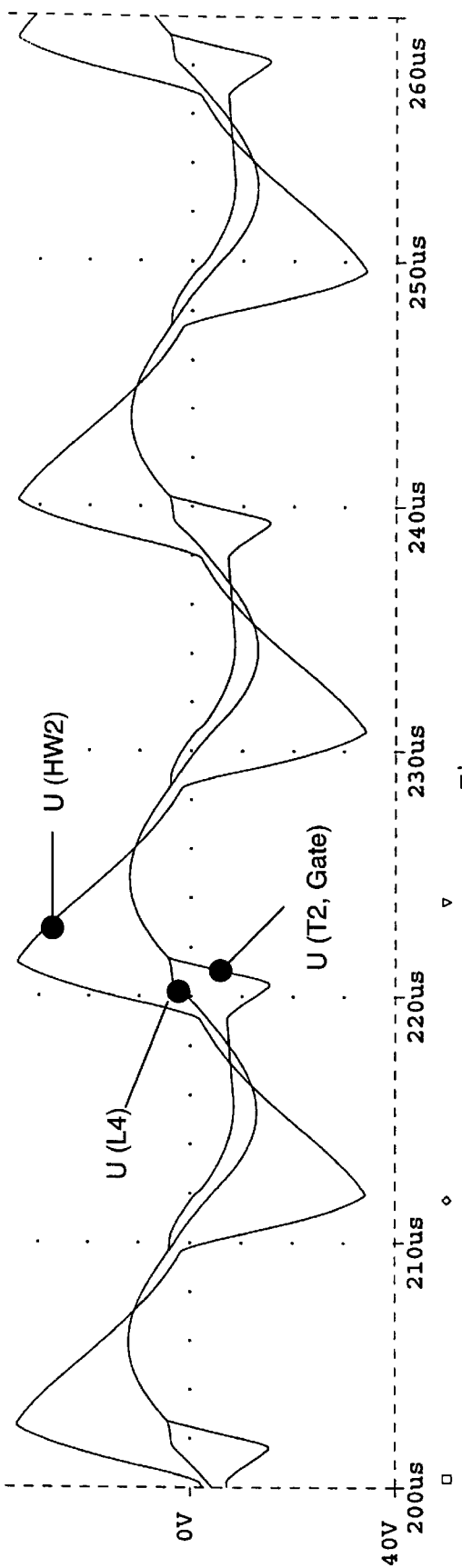

CIRCUIT ARRANGEMENT HAVING LC PARALLEL TUNED DRIVE CIRCUITRY

FIELD OF THE INVENTION

The invention relates to a circuit arrangement for operating a lamp, in particular a low-pressure discharge lamp.

BACKGROUND OF THE INVENTION

In such free-running circuits, the switching elements must be supplied with drive power in time with the switching frequencies.

To this end, known arrangements use a separate current transformer, which is designed either as a saturable-current (toroidal-core) transformer or as a transformer with defined air gap (Hirschmann, W.: "Elektronikschaltungen" Siemens AG, 1982, pages 148 and 150).

The disadvantages of an arrangement of this type consist in that a separate, expensive wound part is required, the manufacturing tolerances of which at the same time have a decisive effect on the functional parameters of the overall arrangement.

Another possibility consists in fitting additional auxiliary windings to the resonant or current-limiting inductor which is already required (cf. L2 in FIG. 1) and applying the control signals thereby obtained to the gate or base inputs of the switching transistors via a phase-shifter network (P 41 29 430.0).

The disadvantage of a circuit arrangement of this type is that, at high DC voltage intermediate circuit voltages, the step-type component of the voltage across the resonant coil, caused by the switch-over of the half-bridge switches, is very strongly superimposed on the sinusoidal component of the voltage which is defined by the resonant current oscillation. As a result, the shape of the signal provided by the auxiliary windings resembles a square-wave function more than a sine function. The phase shifter proposed in the prior art (P 4129430.0) therefore operates only as a lag component, the capacitor of which can no longer be discharged during one RF period by-the sinusoidally decreasing secondary voltage fast enough to ensure reliable switching off of the half-bridge switches during an on-load half-cycle.

SUMMARY OF THE INVENTION

The object of the invention is to specify a circuit arrangement, of the type mentioned at the start, which is produced without a separate cost-intensive wound part (saturable-current transformer, transformer with defined air gap).

The object is achieved by a circuit arrangement which is defined in the claims.

The invention has a large number of advantages.

The circuit arrangement according to the invention can be produced relatively cost-efficiently, since the circuit arrangement requires only inexpensive wound parts whose manufacture can be fully automated.

According to the invention, the phase-shifter circuit, known per se, which cannot deal with high DC voltage intermediate circuit voltages, is developed further in such a way that, even at critical voltages of this type, stable operation of the overall arrangement consisting of the ballast and the lamp is ensured.

An advantageous embodiment of the circuit arrangement according to the invention is characterized in that, in order to couple energy in from the load circuit, the LC parallel tuned circuit can be electrically connected to an auxiliary winding on the at least one inductor of the load circuit through a resistor. This coupling of energy from the load circuit into the drive circuit using electrical connection is simple to produce and independent of geometrical manufacturing tolerances.

A further advantageous embodiment of the circuit arrangement according to the invention is characterized in that, in order to couple energy from the load circuit into the LC parallel tuned circuit, the inductor of the LC parallel tuned circuit is only magnetically coupled to the inductor of the load circuit, and in that a resistor can be connected to the LC parallel tuned circuit (cf. FIG. 2). With this magnetic coupling between the inductor of the LC parallel tuned circuit and the inductor of the load circuit, it is possible to do without the auxiliary windings on the inductor of the load circuit, by means of which faster and less expensive manufacturing is achieved. The conductive track layout on the printed circuit board in furthermore simplified.

A further advantageous embodiment of the circuit arrangement according to the invention is characterized in that the inductor of the load circuit has a magnetic circuit with an incorporated air gap, and the inductor of the LC parallel tuned circuit is configured with an external air gap or as an air-core inductor. This embodiment of the inductors of the LC parallel tuned circuit and of the load circuit permits optimum magnetic coupling and inexpensive production of these inductors.

A further advantageous embodiment of the circuit arrangement according to the invention is characterized in that the drive circuit consists of circuit parts specific to the switching elements, and in that each circuit part specific to the switching elements has the LC parallel tuned circuit (cf. FIG. 1). Relatively fast dimensioning of the drive components is thereby achieved.

Further advantageous embodiments of the circuit arrangement according to the invention are characterized in that, on the one hand, the natural resonant frequency of the LC parallel tuned circuits of each circuit part specific to the switching elements is the same and, on the other hand, the LC parallel tuned circuits of each circuit part specific to the switching elements have identical inductors and identical capacitors, respectively. The intended equal natural resonant frequencies and inductors as well as capacitors of the LC parallel tuned circuits ensure symmetrical operation of the two switching elements of the invertor arrangement.

A further advantageous embodiment of the circuit arrangement according to the invention is characterized in that the inductors of the plurality of LC parallel tuned circuits are magnetically coupled. The magnetic coupling of the inductors of the LC parallel tuned circuits permits a reduction in the effect of manufacturing tolerances (tolerances in the inductors and capacitors) in the drive circuit.

A further advantageous embodiment of the circuit arrangement according to the invention is characterized in that the half-bridge arrangement is formed as two mutually complementary transistors, and in that the drive circuit in configured in such a way that the LC parallel tuned circuit is connected, on the one hand, to the connection point (half-bridge mid-point) of the two switching elements and, on the other hand, to the two control inputs of the switching elements which are connected together (cf. FIG. 13). In this case, one LC parallel tuned circuit suffices for driving both switching elements of the half-bridge, a further switching element, for example a transformer, not being required.

A further advantageous embodiment of the circuit arrangement according to the invention is characterized in that the drive circuit has a further switching element which inverts a drive signal formed by the LC parallel tuned circuit, and in that the drive circuit in furthermore configured in such a way that the drive signal of the LC parallel tuned circuit is fed to one switching element and the inverted drive signal of the LC parallel tuned circuit in fed to the other switching element, respectively (cf. FIG. 3). One advantage of this embodiment consists in that no asymmetries occur in the operation of the two switching elements of the invertor or that tolerances due to manufacturing in the components of the LC parallel tuned circuit have an equal effect on both switching elements. The costs for the further circuit part are partially compensated for in that only one auxiliary winding in required on the inductor of the load circuit. Furthermore, the switching element TR may be designed in such a way as to substitute for the inductor L3, L4 as well.

A further advantageous embodiment of the circuit arrangement according to the invention is characterized in that the drive circuit has a further circuit part which produces at a first output a drive signal formed by the LC parallel tuned circuit in inverted form, and at a second output the drive signal of the LC parallel tuned circuit in non-inverted form, and in that the drive circuit is furthermore configured in such a way that the control input of one switching element is connected to one output of the switching element, and the control input of the other switching element is connected to the other output of the switching element (cf. FIG. 4) This achieves the further advantage that the LC parallel tuned circuit may be at a reference potential which is not simultaneously a reference potential of one of the two switching elements.

Further advantageous embodiments of the circuit arrangement according to the invention are characterized in that the further switching element is a transformer, the transformer having one or more secondary windings, and each secondary winding being assigned to at least one switching element of the invertor. The required DC isolation of the drive signals for the two switching elements of the half-bridge is produced by the transformer in simple fashion, specifically by the secondary windings.

A further advantageous embodiment of the circuit arrangement according to the invention is characterized in that the resistor through which the auxiliary winding can be connected to the LC parallel tuned circuit is linear, non-linear or temperature-dependent. Although a linear resistor represents the most cost-efficient embodiment for this resistor, the use of a non-linear or temperature-dependent resistor permits the implementation of matching of the drive circuit to particular ambient conditions (for example high ambient temperature) or overall arrangement conditions (for example unusual lamp operating voltage).

A further advantageous embodiment of the circuit arrangement according to the invention is characterized in that a series circuit consisting of a diode and a resistor in connected in parallel with the LC parallel tuned circuit in such a way that the half-cycle of the LC parallel tuned circuit during which the control voltage at the control input of a switching element of the invertor is negative is more strongly damped so that the dead time of the half-bridge is extended (cf. FIG. 5). One advantage of this embodiment is that the duty ratio of the switching elements is altered in such a way that the time for which a switching element is activated is shorter within one period.

A further advantageous embodiment of the circuit arrangement according to the invention is characterized in that, between the LC parallel tuned circuit and the switching element a further resistor is arranged which, during the charge-transfer phase of a switching load-reduction capacitor by transfer of the charge of this capacitor, produces a voltage drop which counteracts the drive voltage of the LC parallel tuned circuit so that switching-on of the switching element during the transfer of the charge of the switching load-reduction capacitor is prevented (cf. FIG. 6). A switching element should not be switched on until the freewheeling diode of a switching element carries current. This is the case, in this embodiment of the circuit arrangement according to the invention, if the switching load-reduction capacitor has its charge fully transferred after the other respective switching element is switched off. The present embodiment makes it possible to make the switch-on time of a switching element dependent on the charge-transfer phase of the switching load-reduction capacitor.

In conjunction with this, provision is furthermore made that a diode is connected in parallel with the further resistor in such a way that its anode is connected to that terminal of the LC parallel tuned circuit which is not connected to the control input of the switching element and that the cathode is connected to the reference potential of the switching element. This diode permits fast switching-off of the switching elements.

A further advantageous embodiment of the circuit arrangement according to the invention is characterized in that, between the control input of a switching element and the corresponding LC parallel tuned circuit, a pulse-shaping and impedance-converting quadripole is looped in which accelerates the switching-off of the switching element (cf. FIGS. 7 and 8). This achieves an improved switch-off response of the switching elements and thereby minimization of the switching losses.

A further advantageous embodiment of the circuit arrangement according to the invention is characterized in that a voltage-dependent damping component is arranged in parallel with the LC parallel tuned circuit (cf. FIG. 9). This damping component protects the control input of the switching elements from a voltage overload.

A further advantageous embodiment of the circuit arrangement according to the invention is characterized in that a series circuit, consisting of a Zener diode and a resistor which is connected to the anode of the Zener diode, is connected in parallel with the LC parallel tuned circuit, and in that the control input of the switching element is connected to the anode of the Zener diode and the reference potential of the switching element is connected to the connection point between the resistor and the LC parallel tuned circuit (cf. FIG. 10). Inserting the Zener diode achieves a seemingly higher threshold voltage of the switching element and thereby a reduction in the time for which the switching element is activated by the LC parallel tuned circuit.

This time is further shortened by an advantageous embodiment of the circuit arrangement according to the invention which is characterized in that, in series with the inductor of the LC parallel tuned circuit, a parallel circuit consisting of a diode and a resistor is arranged in such a way that the cathode of the diode and a terminal of the resistor are connected to the reference potential of the control input of a switching element, and that the anode of the diode and the other terminal of the resistor are connected to the inductor of the. LC parallel tuned circuit, or the anode of the diode and a terminal of the resistor are connected to the control input of a switching element and the cathode of the diode and the other terminal of the resistor are connected to the inductor of the LC parallel tuned circuit, as a result of which a negative DC voltage offset, adjustable through the resistance of the resistor, is achieved in the output voltage of the LC parallel tuned circuit relative to the control input of the switching element (cf. FIG. 11).

A further advantageous embodiment of the circuit arrangement according to the invention is characterized in that a clamping resistor is inserted between the control input of the switching element and the reference potential for this control input, and in that, in order to extend the dead time a resistor divider and a further switching element are inserted between the control output of the LC parallel tuned circuit and the switching element, which switching element only applies the output voltage of the LC parallel tuned circuit to the switching element if the control voltage, formed by the resistor divider from the control voltage of the LC parallel tuned circuit, for this further switching element exceeds the threshold voltage of the latter and switches it on (cf. FIG. 12). This embodiment permits an active extension of the dead time up to a phase angle of 90° (relative to the drive voltage).

Finally, a further advantageous embodiment of the circuit arrangement according to the invention is characterized in that the threshold voltage of the switching elements can be predetermined in such a way that a predeterminable on-time of the switching elements can be produced. This embodiment, in which the threshold voltage of the switching elements may take on an unusually high value, affords the advantage that, when using these switching elements, which are special in so far as regards the extension of the dead time $t_T$, the same effect can be achieved an with the other embodiments mentioned above, but without additional components.

BRIEF DESCRIPTION OF THE DRAWINGS

FIGS. 17A, 17B show voltage waveforms as a function of time for the circuit arrangement in FIG. 12.

BEST MODE FOR CARRYING OUT THE INVENTION

Figure 1:
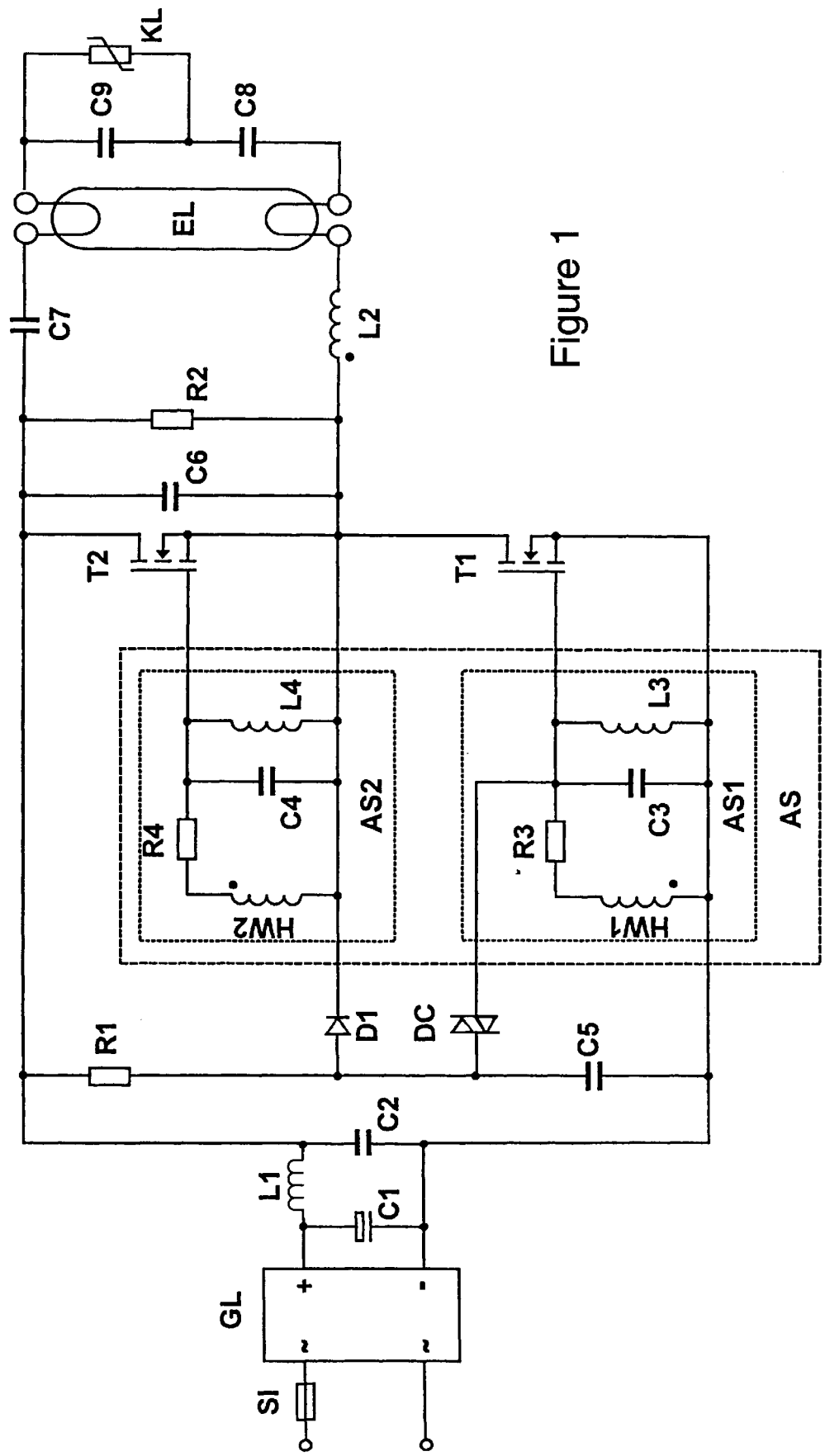
FIG. 1 shows one embodiment of the circuit arrangement according to the invention.

FIG. 1 represents the circuit diagram of a circuit arrangement with a push-pull half-bridge for operating a low-pressure discharge lamp EL. Directly at the mains input, a fuse SI is connected into a lead. This is followed by the rectifier GL whose output is bridged by a smoothing capacitor C1, and a radio interference suppression component consisting of a filter coil L1 in the positive lead and a capacitor C2 in parallel with the smoothing capacitor C1. The self-regulating, free-running invertor, here a push-pull half-bridge, consists of the two switching elements (preferably MOSFET transistors or IGBT transistors with freewheeling diode) T1 and T2 and the starting circuit with the resistors R1, R2, the capacitor C5, the diode D1 and the diac DC. The lamp EL is connected, via one terminal of the first electrode, through a resonant inductor L2 to the centre tap between the two transistors T1, T2, and via one terminal of the second electrode, through a coupling capacitor C7, to the positive pole of the capacitor C2.

Furthermore, a series resonant circuit is provided, which consists of the resonant inductor L2, the coupling capacitor C7 and two resonant capacitors C8, C9, the two resonant capacitors C8, C9 being connected in series into the heating circuit of the lamp EL. A PTC resistor KL is furthermore connected in parallel with the capacitor C9. In parallel with the switching path of the transistor T2, a capacitor C6 is furthermore connected in order to reduce the load on the switching elements.

In the illustrative embodiment represented in FIG. 1, the transistors T1 and T2 are driven, in a manner known per se, through auxiliary windings HW1 and HW2 which are fitted to the resonant inductor L2. According to the invention, a network, in the form of an LC parallel tuned circuit consisting of L3 or L4 and C3 or C4 and a ballast resistor R3 or R4, is in each case fitted between the auxiliary windings HW1, HW2 and the gate inputs of the switching elements T1, T2. The effect achieved by these circuit technology measures is that the circuit operates stably even at high voltages across the smoothing capacitor C1. In the illustrative embodiment represented in FIG. 1, the auxiliary windings HW1 and HW2 each have the same turns number $n_{HW1}=n_{HW2}$.

In the illustrative embodiment represented in FIG. 1, the drive circuit AS for driving the two switching elements T1, T2 of the half-bridge comprises two circuit parts AS1 and AS2 specific to the circuit elements. A general provision of the invention is that the drive circuit has at least one LC parallel tuned circuit.

To couple energy from the load circuit, the LC parallel tuned circuit is electrically connected or connectable to an auxiliary winding HW1, HW2 on the inductor L2 of the load circuit through a resistor R3, R4.

Figure 2:
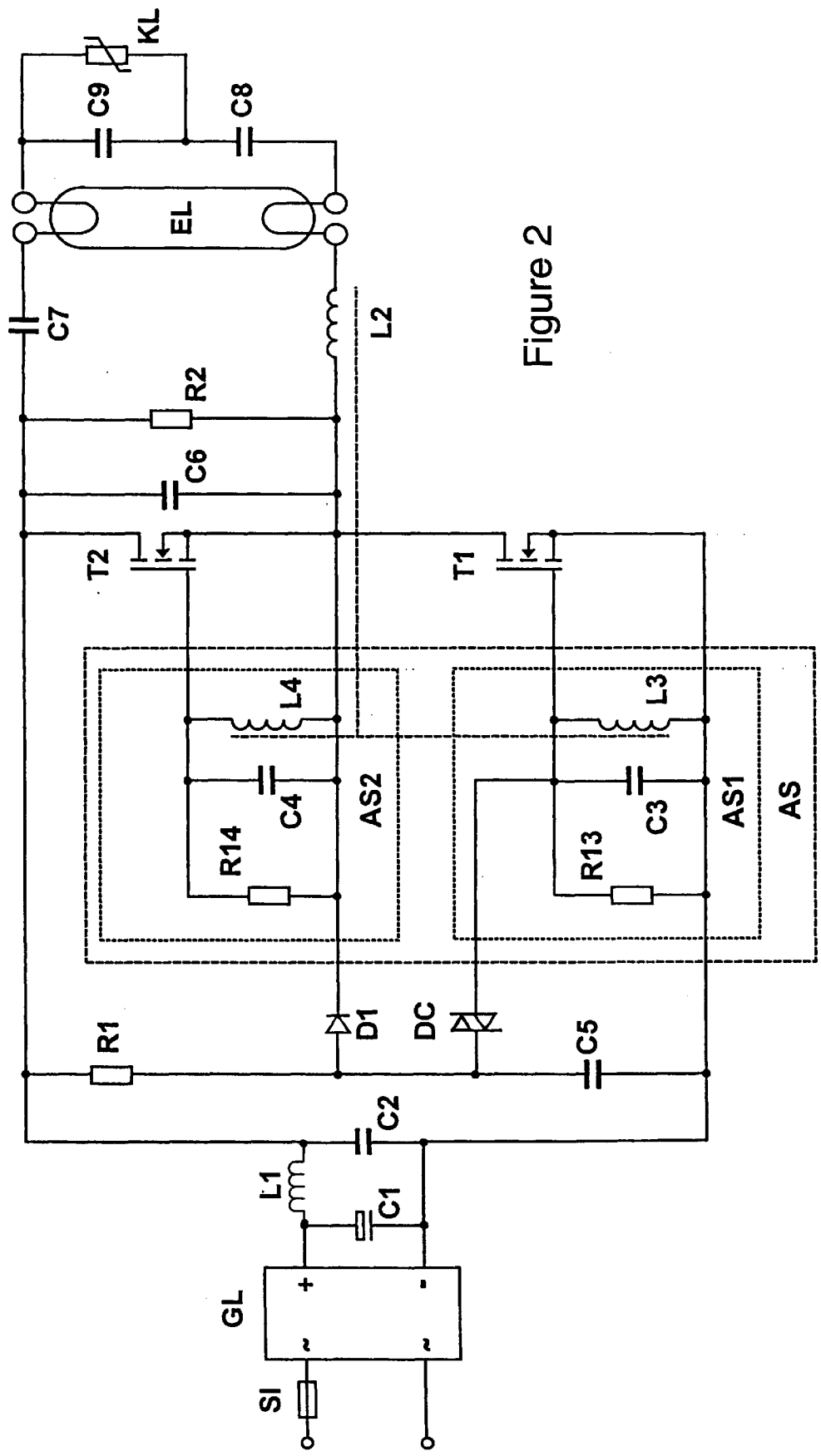
FIGS. 2–13 show further embodiments according to the invention.

FIG. 2 represents an embodiment of the circuit arrangement according to the invention. In this circuit arrangement, in order to couple energy from the load circuit into the LC parallel tuned circuit, the inductor L3, L4 of the LC parallel tuned circuit is only magnetically coupled to the inductor L2 of the load circuit, a resistor R13, R14 being connectable in parallel with the LC parallel tuned circuit. The magnetic coupling is produced by arranging the inductor L3, L4 in proximity to the inductor L2.

In conjunction with this, provision may be made that the inductor L2 of the load circuit has a magnetically closed circuit with an incorporated air gap, in particular by using a corresponding core design (for example "E-core"). The inductor L3, L4 of the LC parallel tuned circuit is in this case configured with an external air gap or as an air-core inductor. The inductors L3, L4 are preferably formed by a rod-core coil.

According to the invention, provision is made that the drive circuit AS consists of circuit parts AS1, AS2 specific to the circuit elements. Each circuit part specific to the circuit elements then has the LC parallel tuned circuit as represented in FIGS. 1 and 2.

The natural resonant frequency of the LC parallel tuned circuits of each circuit part specific to the circuit elements is preferably the same.

Preferably, provision is also made that these LC parallel tuned circuits of each circuit part specific to the circuit elements each have identical inductors and identical capacitors.

Figure 14:
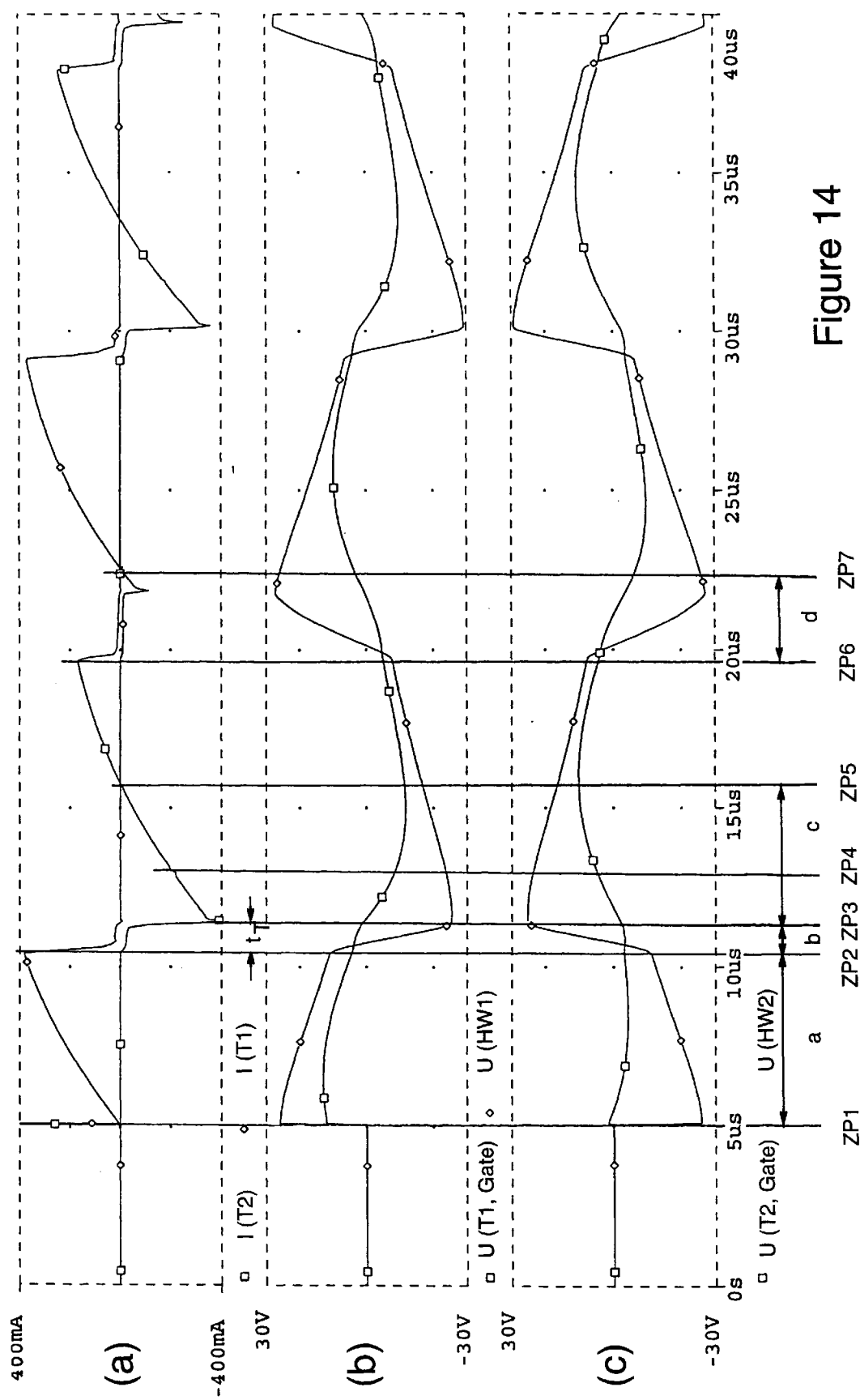
FIGS. 14A, 14B, 14C shows voltage and current waveforms for the two switching elements T1, T2 during starting.
Figures 15A, 15B, 15C:
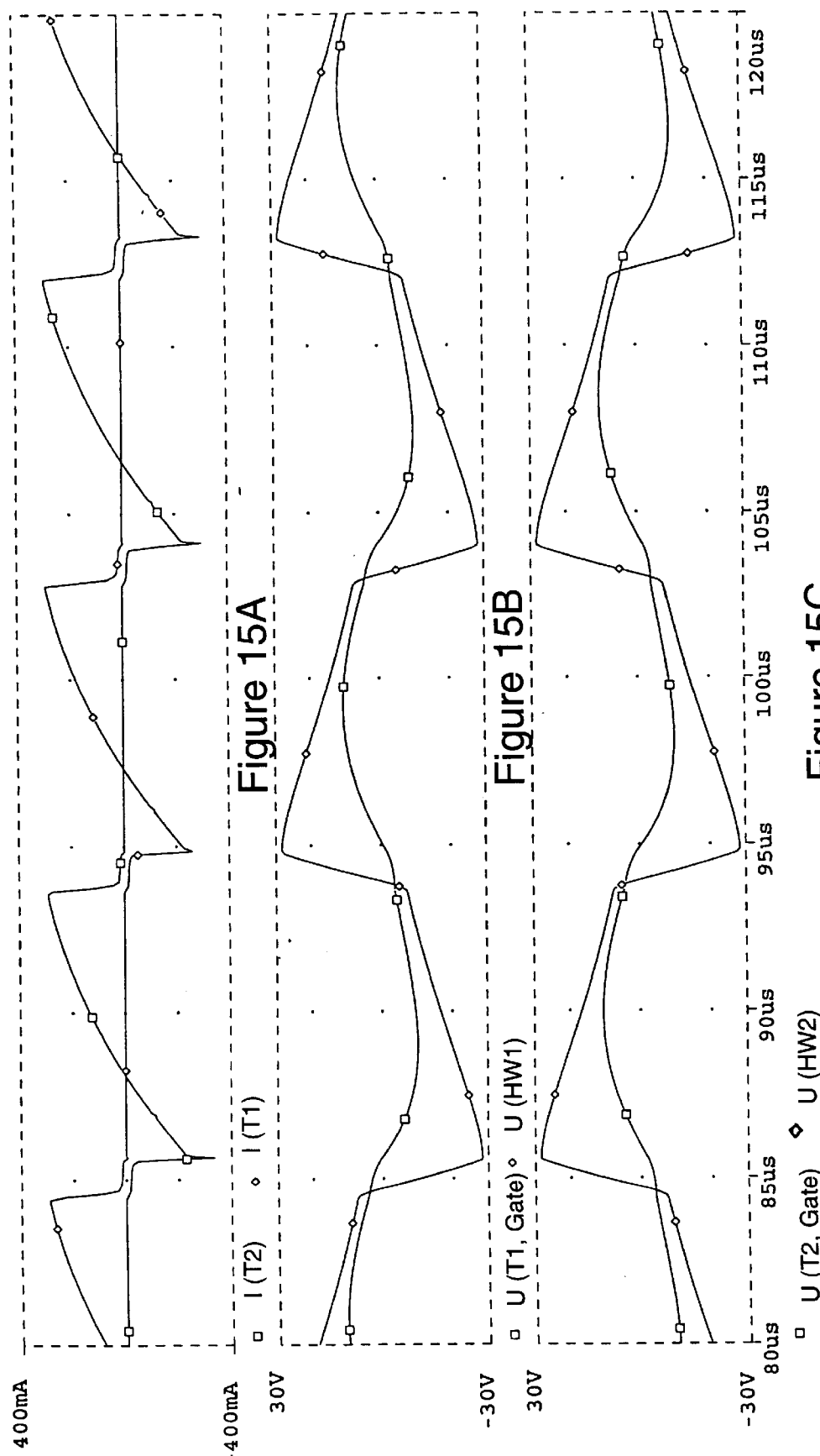
FIGS. 15A, 15B, 15C show waveforms for the two switching elements T1, T2 during steady state operation.

The waveform of the voltages and of the currents in the two switching elements T1, T2 of the half-bridge will now be described with reference to FIGS. 14 and 15, FIG. 14 representing the voltage response U(T1, gate), U(HW1); U(T2, gate), U(HW2) in the two drive circuits and the corresponding transistor currents I(T1), I(T2) during starting, and FIG. 15 representing them for a steady operating state.

As a result of initial activation of the circuit using the Diac DC represented in FIG. 1, at time ZP1 (FIG. 14), the capacitor C3 charges and turns the transistor T1 on. The voltage across the auxiliary winding HW1 then jumps to a value defined by the turns ratio $$\mu = \frac{n_{primary}}{n_{HW1}}$$

(=ratio of the number $n_{primary}$ of windings on the primary winding of the coil L2 to the number $n_{HW1}$ of windings on the auxiliary winding HW1 on the coil L2) and the intermediate circuit DC voltage. A sinusoidal current starts to flow in the coil L2.

The voltage across the coil L2, and therefore across the auxiliary winding HW1, then decreases according to $$U(t) = -L \cdot \frac{d\,I(t)}{d\,t}$$

(Time interval a between ZP1 and ZP2, FIG. 14). However, in spite of this reduction, the voltage across the auxiliary winding HW1 remains large enough for the capacitor C3 to be charged further through the resistor R3. Because of the voltage across C3, a sinusoidally increasing current starts to flow in the coil L3, which current discharges the capacitor C3. The voltage at the control input (gate) of the transistor T1 therefore decreases until it is below the threshold voltage of T1 and T1 switches off (time ZP2, FIG. 14).

As a result of this switching process, the resonant current applied in the coil L2 reverses the voltage across the inductor and therefore across the auxiliary windings HW1, HW2. The capacitor C3 then has its charge transferred through R3 by the voltage across HW1 and the current applied in the coil L3 of the LC parallel tuned circuit, and the gate voltage of T1 becomes negative. The capacitor C4, at first negatively charged by HW2 through R4, is then charged through R4 from the auxiliary winding HW2, since the voltage across HW2 increases abruptly when the half-bridge is switched over (time period b between times ZP2 and ZP3, FIG. 14). As a result of the low-pass function of R4/C4, the voltage across C4, the coil L4 and therefore also the gate of T2, increases sinusoidally. When the threshold voltage of T2 is exceeded, it switches on (time ZP4, FIG. 14). Because of the phase shift between the resonant current in L2 and the gate voltage at T2, switching-on takes place while the freewheeling diode of the switching element T2 is carrying the resonant current (time interval c between times ZP3 and ZP5, FIG. 14). The drive voltage provided by the auxiliary winding HW2 decreases sinusoidally, but nevertheless contributes little or not at all to the discharging of C4.

The coil L4 then discharges the capacitor C4, even though a high drive voltage is still available and by virtue of its applied current forces transfer of the charge from C4 and therefore reliable and fast switching-off of the transistor (time ZP6, FIG. 14). As a result of the recent switch-over of the half-bridge, the resonant current applied in the coil L2 reverses the voltage across the auxiliary windings HW1 and HW2 and the primary winding. The capacitor C4 then also becomes negatively charged through R4 by HW2, and the capacitor C3 becomes positively charged through R3 by HW1 (time interval d between times ZP6 and ZP7, FIG. 14). As a result, the transistor T1 is switched on again and the described process begins again from the start.

If the capacitor C6 represented in FIGS. 1–13 (in parallel, for example, with the transistor T2) is used for switching load reduction, then it is necessary for there to be a sufficient dead time $t_T$ (=time interval b=duration of the transfer of the charge in the capacitor C6) between the switching-off of one half-bridge transistor and the switching-on of the other.

In the normal case (switching load-reduction capacitor C6 has conventionally used capacitances) this dead time is provided by the fact that the voltage falls below the threshold voltage of one transistor before the output voltage of the associated drive circuit becomes zero, whereas the output voltage, symmetrical thereto, of the other drive circuit must rise to the value of the threshold voltage of the transistor to be switched on before the latter actually turns on.

FIG. 15 shows the voltage and current waveforms of the currents in the witching elements T1, T2 and the voltages in the auxiliary windings and the control voltages of the LC parallel tuned circuits when the overall arrangement is in a steady operating state. It can be seen that the said voltage and current waveforms of the drive circuits specific to the switching elements have symmetrical profiles.

In practice, the elements of the LC parallel tuned circuit which are represented in FIG. 1 are subject to non-negligible manufacturing tolerances. These have an effect primarily if the natural resonant frequencies $$f_{res} = \frac{1}{2\pi\sqrt{L3/4 \cdot C3/4}}$$

of the two drive circuits (AS1, AS2) differ greatly, because mutually symmetrical drive voltage waveforms in the two drive circuits AS1 and AS2 can then no longer be assumed.

Embodiments of the circuit arrangement according to the invention which, in particular, are represented in FIGS. 5, 6, 10, 11 and 12, increase the achievable dead time when switching over the half-bridge by delayed switching-on of the transistors, in order to ensure full transfer of the charge in the switching load reduction capacitor C6 by the free-wheeling energy stored in the inductor L2.

Figure 5:
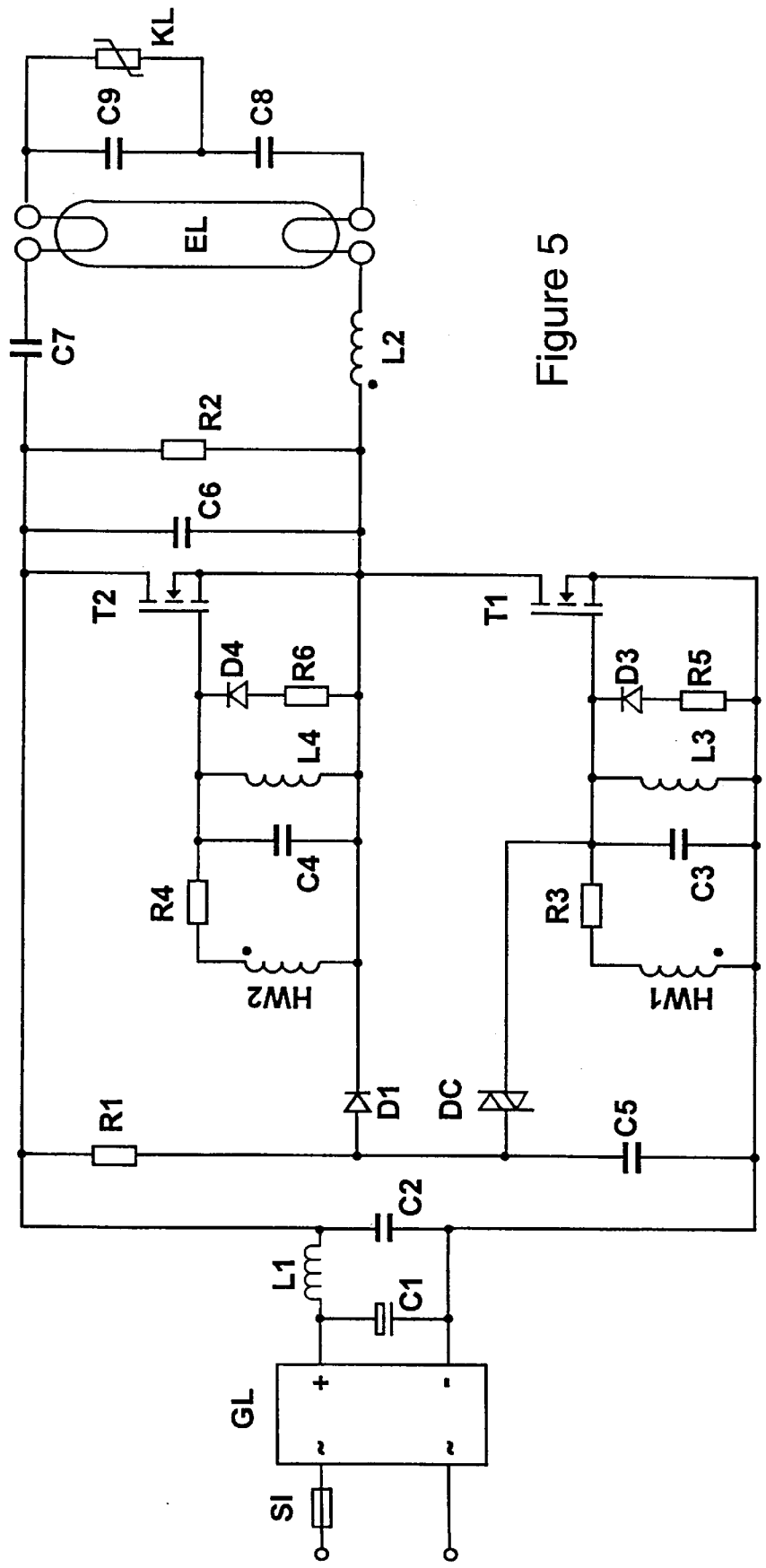

In the embodiment of the circuit arrangement according to the invention which is represented in FIG. 5, a series circuit consisting of a diode D3 or D4 and a resistor R5 or R6 is respectively connected in parallel with each of the two LC tuned circuits in such a way that only the negative half-cycle (negative gate voltage) of the oscillation of the LC tuned circuit is damped.

This leads to a deformation of the drive voltage curve, which has a shorter positive half-cycle with higher amplitude and a longer negative half-cycle with lower amplitude, and a shift in the duty ratio is thereby achieved.

Figure 6:
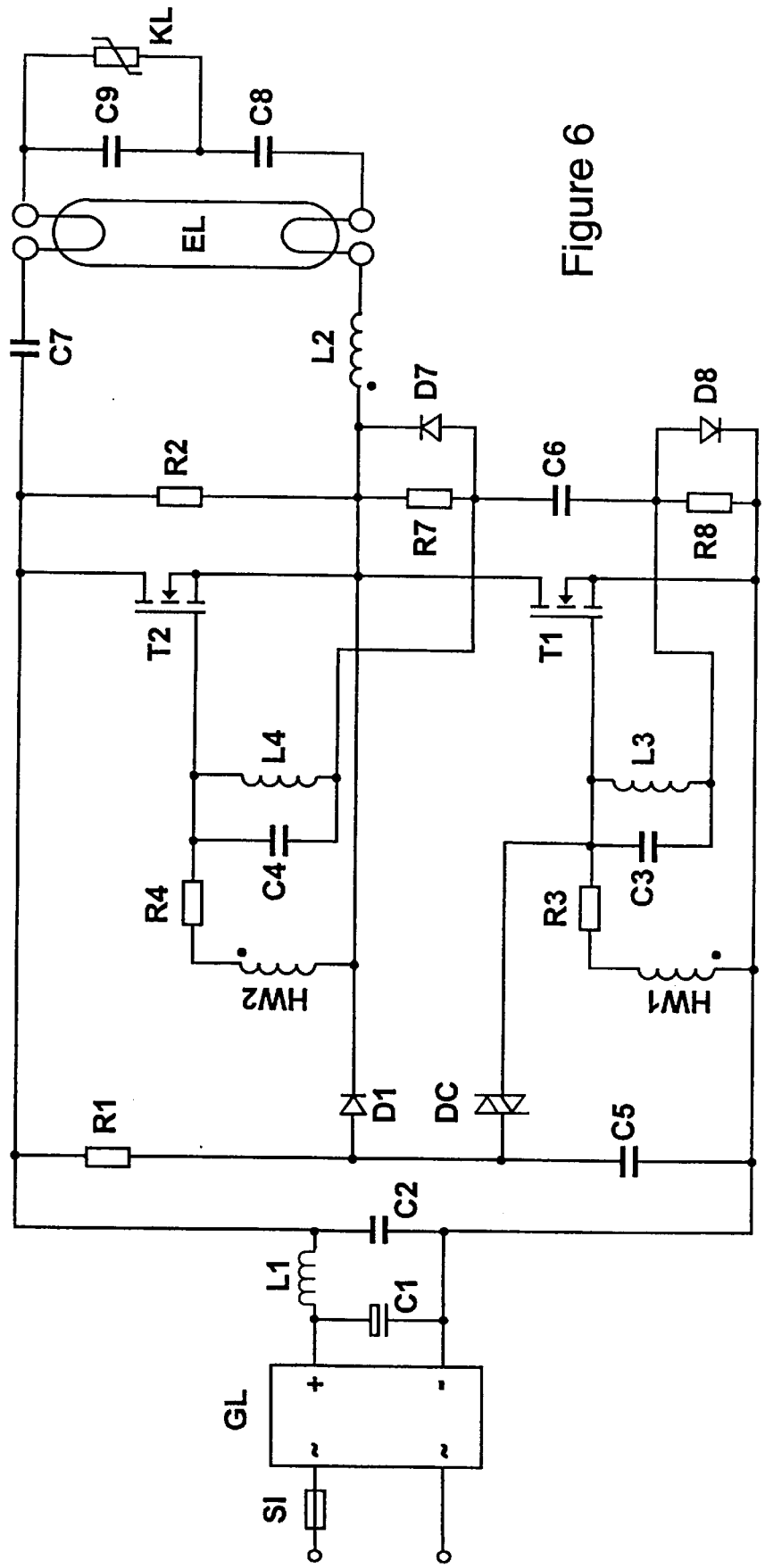

A further embodiment of a switch-on delay, which may also supplement the circuit arrangement described above with reference to FIG. 5, is represented in FIG. 6.

In this circuit arrangement, the current in the switching load-reduction capacitor C6 in received by two resistors (R7, R8). To this end, a series circuit consisting of two resistors R7, R8 and the capacitor C6 is connected in parallel with the transistor. T1 in such a way that one resistor (R8) is at the earth potential, and the other resistor (R7) is connected to the connection point of the two switching transistors T1, T2, and that the capacitor C6 is connected between the two resistors R7, R8. A diode D7, D8 whose anodes are connected to the respective terminal of the switching load-reduction capacitor C6 in connected in parallel with each of the resistors R7, R8.

In the circuit arrangement represented in FIG. 6, the LC parallel tuned circuits are not connected in parallel with the gate-source path of the transistors T1, T2, but are connected via one terminal to the gate of the respective transistor and via the other to the cathode of the diodes D7 (L4, C4) and D8 (L3, C3).

When the transistor T1 is switched on, the switching load-reduction capacitor C6 is discharged. If the gate voltage of T1 then falls below the specified threshold value, T1 switches off. This leads to charging of C6 and a voltage drop across R7 and R8.

Switching-on of T2 is then delayed in that the voltage drop across the resistor R7 due to the discharging process of C6 in subtracted from the drive voltage for T2, which is delivered by the drive circuit consisting of L4, C4, R4 and HW1.

The voltage drop across R8, which counteracts the switching-off of T1 and which would therefore cause very high-loss switching, is limited by the diode D8 to its forward voltage.

When the gate voltage of T2 falls below its threshold value, then T2 switches off, and the capacitor C6 is discharged again through the resistors R7 and R8 by the current applied in the coil L2. The voltage drop across R7 in then limited by the diode D7 to its forward voltage and the voltage across R8 is subtracted from the voltage delivered by the drive circuit arranged at the transistor T1; switching-on of T1 is thereby delayed.

The resistor R3, R4 or R13, R14 (FIG. 5) may be linear, non-linear or temperature-dependent. It is thereby possible to make the driving of the two switching elements dependent on ambient conditions or overall arrangement states. By way of example, provision may be made that, at very high ambient temperatures, the power consumption of the overall arrangement is reduced by the resistance of the resistor R3, R4, R13, R14 becoming smaller in proportion with an increase in the temperature The use of a non-linear resistor may be provided if the drive circuit is intended to react to extraordinary operating states (such as an operating voltage which is unusually high in mass production of the lamp) of the overall arrangement in such a way as to ensure reliable operation even under exceptional conditions.

Figure 3:
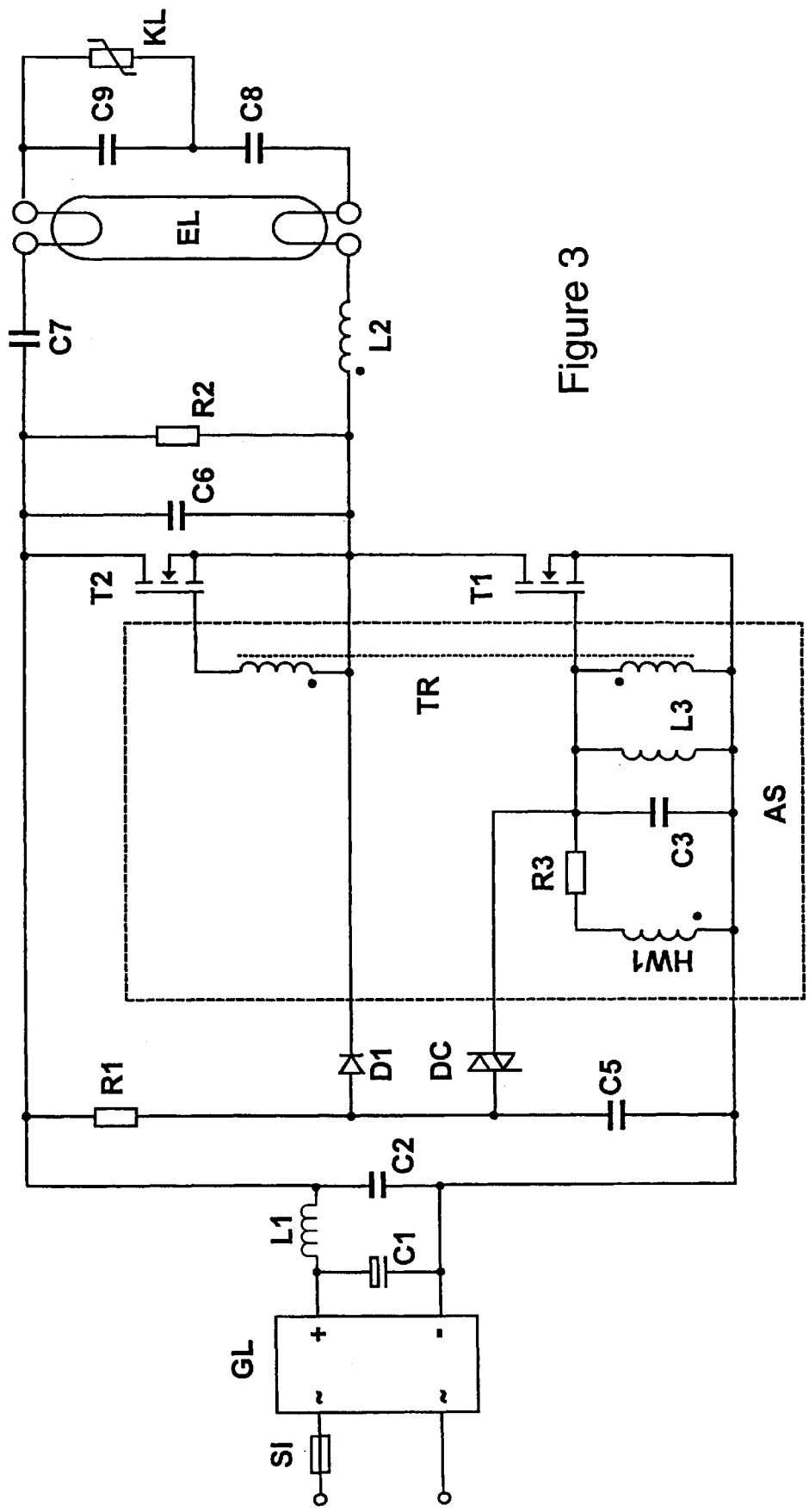
Figure 4:
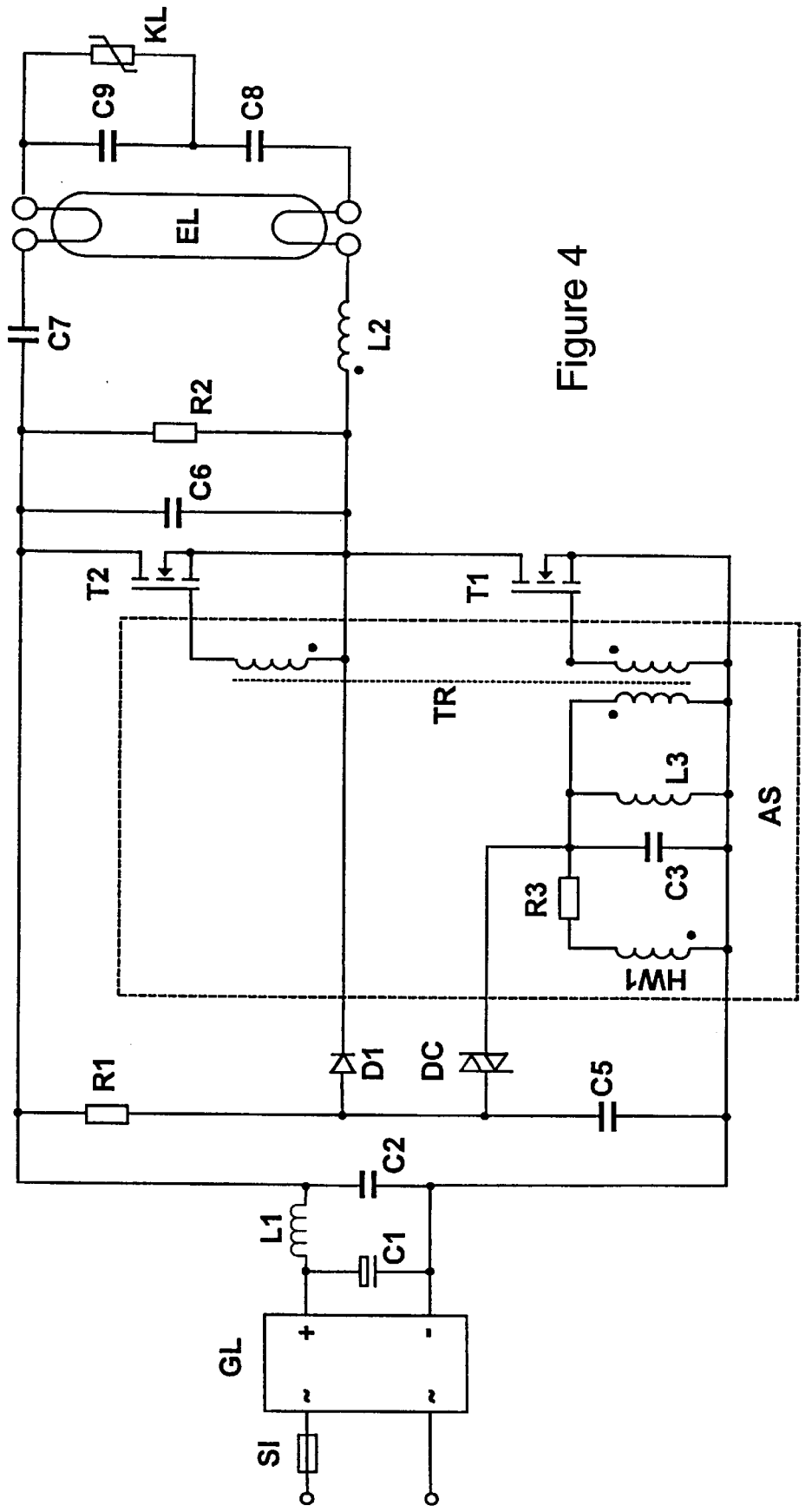

FIGS. 3 and 4 represent further embodiments of the circuit arrangement according to the invention. In this circuit arrangement, the drive circuit AS has a further switching element TR which inverts a drive signal formed by the LC parallel tuned circuit. This further switching element TR is preferably a transformer, it being possible for this transformer to embody the inductors L3, L4 of the LC parallel tuned circuit. The drive circuit is furthermore configured in such a way that the drive signal of the LC parallel tuned circuit is delivered to one switching element (for example T1) and the inverted drive signal of the LC parallel tuned circuit is delivered to the other switching element (for example T2), respectively. This produces no asymmetries in the operation of the two switching elements of the invertor. Tolerances due to manufacture in the components of the LC parallel tuned circuit have equal effects on both switching elements T1, T2.

As represented in FIG. 4, the drive circuit may be configured in such a way that the control input of one switching element (for example T1) is connected to one output of the further switching element TR, and the control input of the other switching element (for example T2) is connected to the other output of this further switching element TR. The LC parallel tuned circuit is at a reference potential which is not at the same time a reference potential of one of the two switching elements T1, T2.

As mentioned, the further switching element is, for example, a transformer, the transformer having one or more secondary windings. Each secondary winding is assigned to at least one switching element of the invertor. With the transformer, the required DC isolation of the drive signals for the two switching elements T1, T2 of the half-bridge is produced in simple fashion by the secondary windings.

Figure 7:
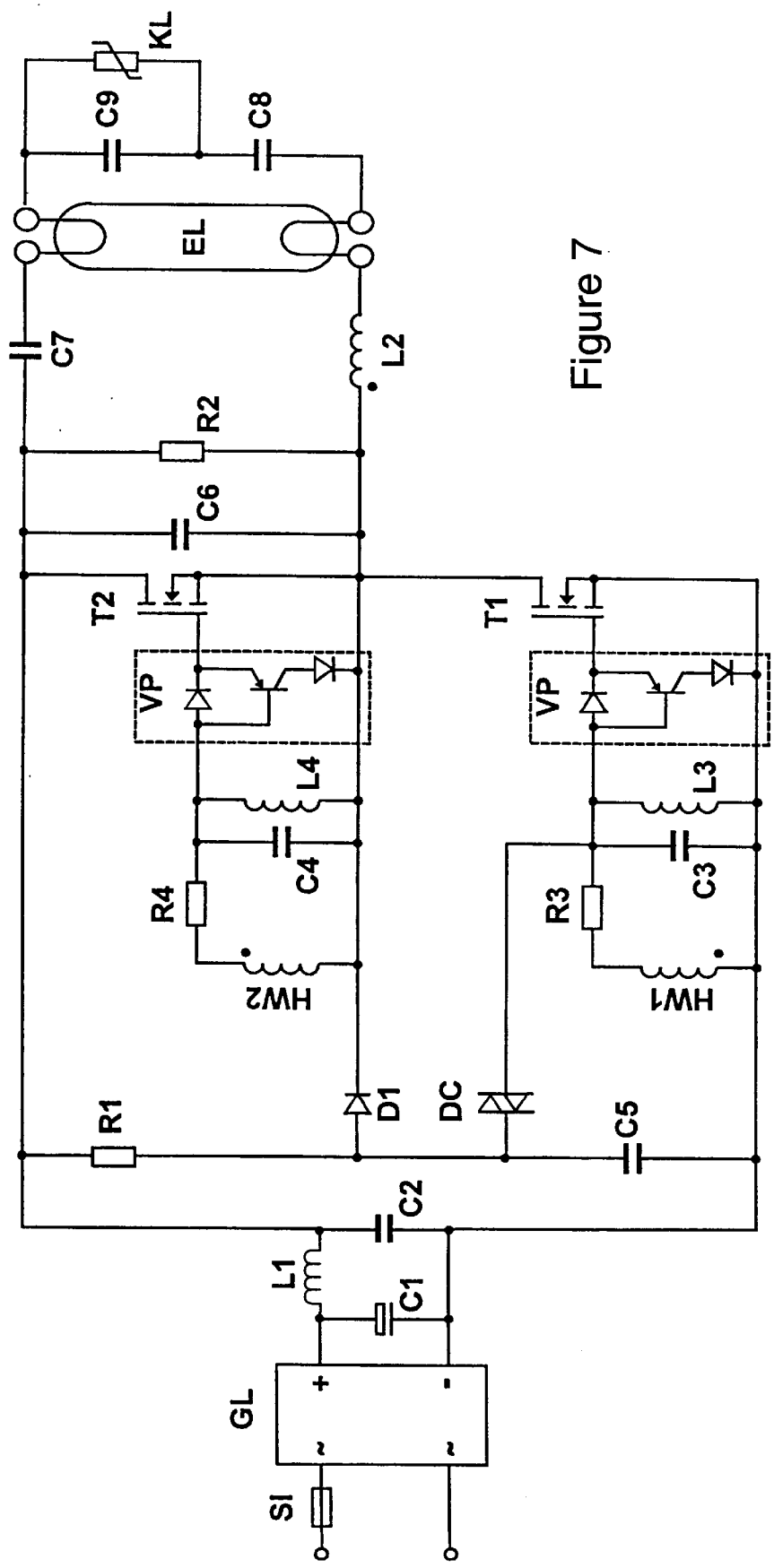
Figure 8:
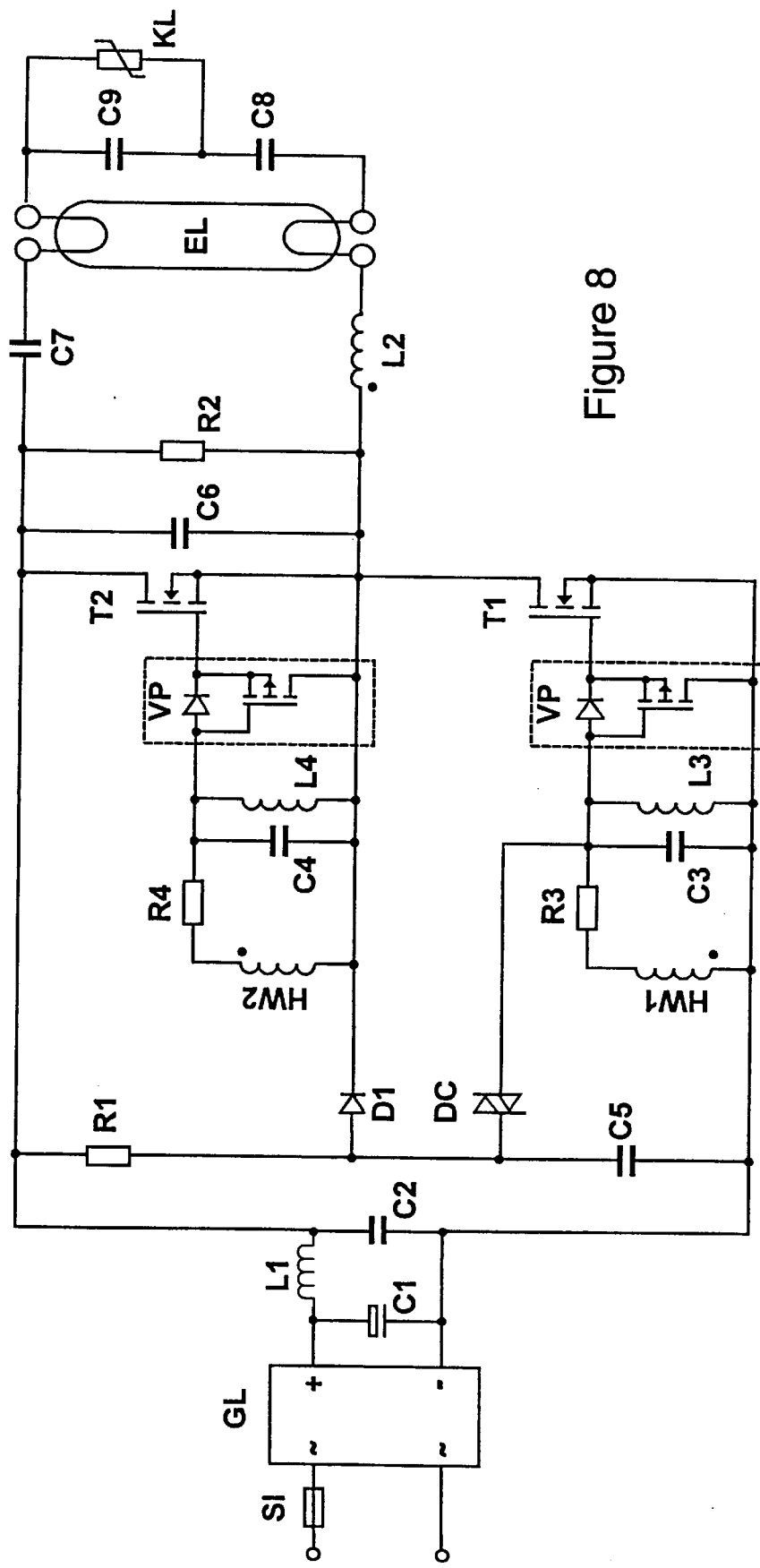

FIGS. 7 and 8 show embodiments of the circuit arrangement according to the invention in which a pulse-shaping and impedance-converting quadripole VP is looped in between the control input of the switching element T1, T2 and the corresponding LC parallel tuned circuit. This quadripole accelerates the switching-off of the switching element T1, T2.

In the circuit arrangement according to FIG. 7, the pulse-shaping or impedance-converting quadripole VP is designed as a clearing network with two diodes and one small-signal bipolar transistor.

The circuit variant shown in FIG. 8 uses a MOSFET transistor and a diode.

As a result of the establishment of an off-state voltage when the drive voltage of the LC parallel tuned circuit decreases, the diode of the quadripole VP, which diode is connected between the LC parallel tuned circuit and the control input of the switching element T1, T2, forms the threshold voltage which switches on the respective small-signal transistor of the quadripole VP. The input capacitor of the switching element T1, T2 is thereby abruptly discharged and the switching element is switched off.

In the bipolar embodiment of the quadripole (FIG. 7), the further-diode prevents undesired flow of current through the base-collector diode of the small-signal transistor.

Figure 9:
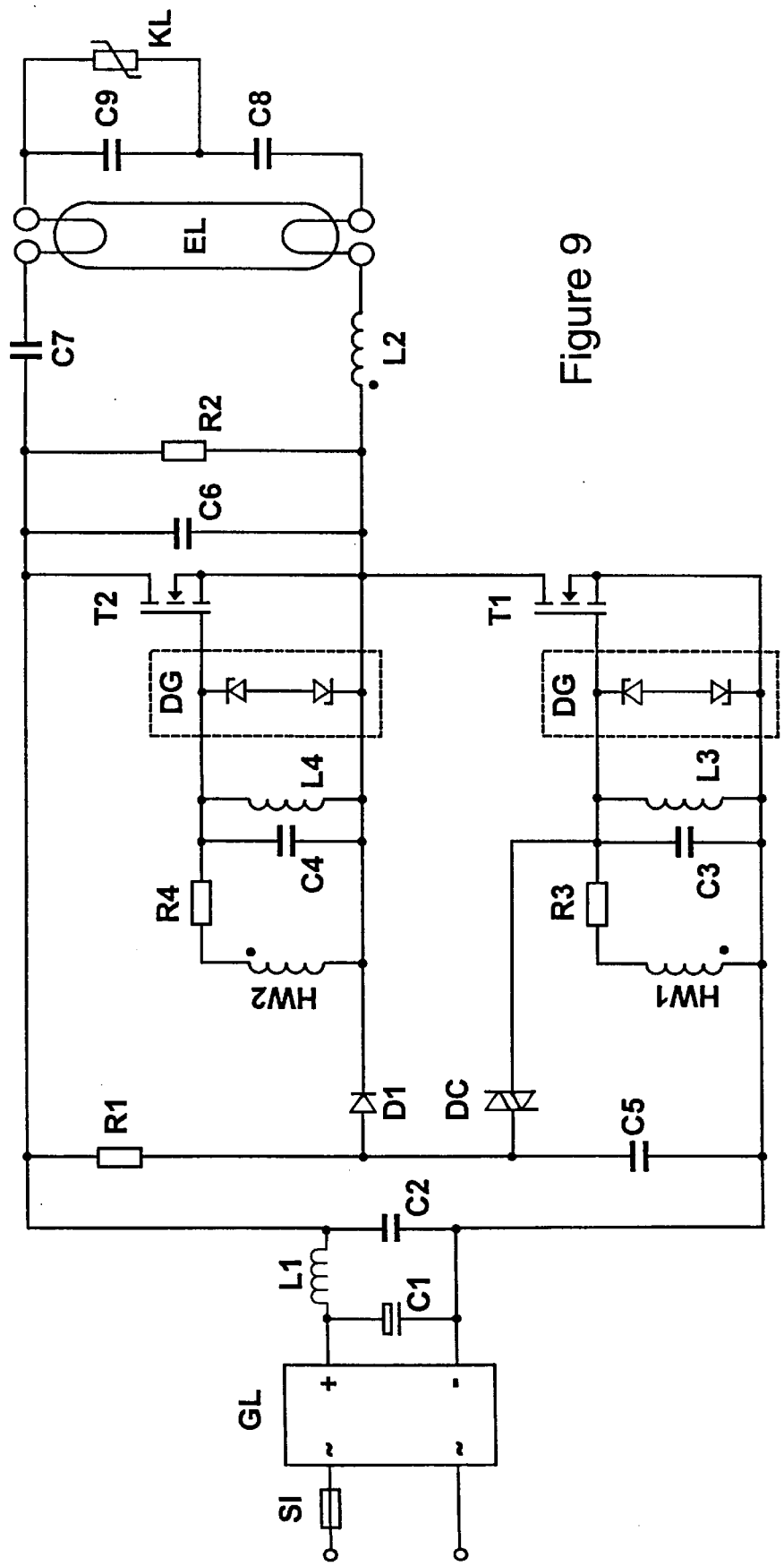

FIG. 9 shows a further embodiment of the circuit arrangement, a voltage-dependent damping component DG (preferably two Zener diodes connected in anti-series) being arranged in parallel with the LC parallel tuned circuit in order to limit the control voltage of the switching element T1, T2. This arrangement achieves overvoltage protection for the control input of the switching elements.

Figure 10:
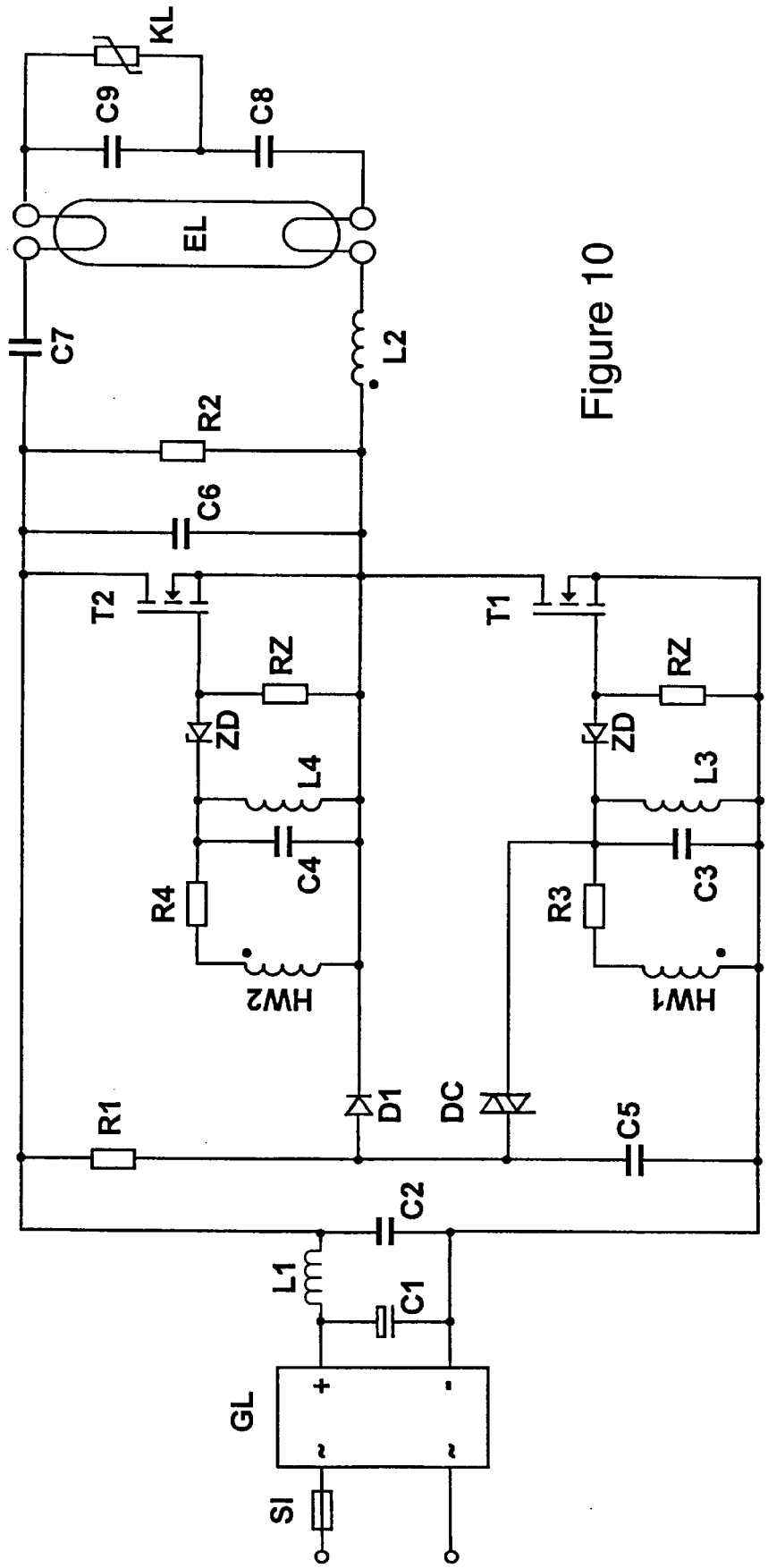

As represented in FIG. 10, as an alternative or in addition to the embodiments described above, a Zener diode ZD and a resistor RZ may be connected between the control input of the switching element T1, T2 and the LC parallel tuned circuit, in such a way that the Zener voltage is added to the threshold voltage of the switching element and only a higher drive voltage of the LC parallel tuned circuit leads to switching-on of the switching element T1 or T2.

Figure 13:
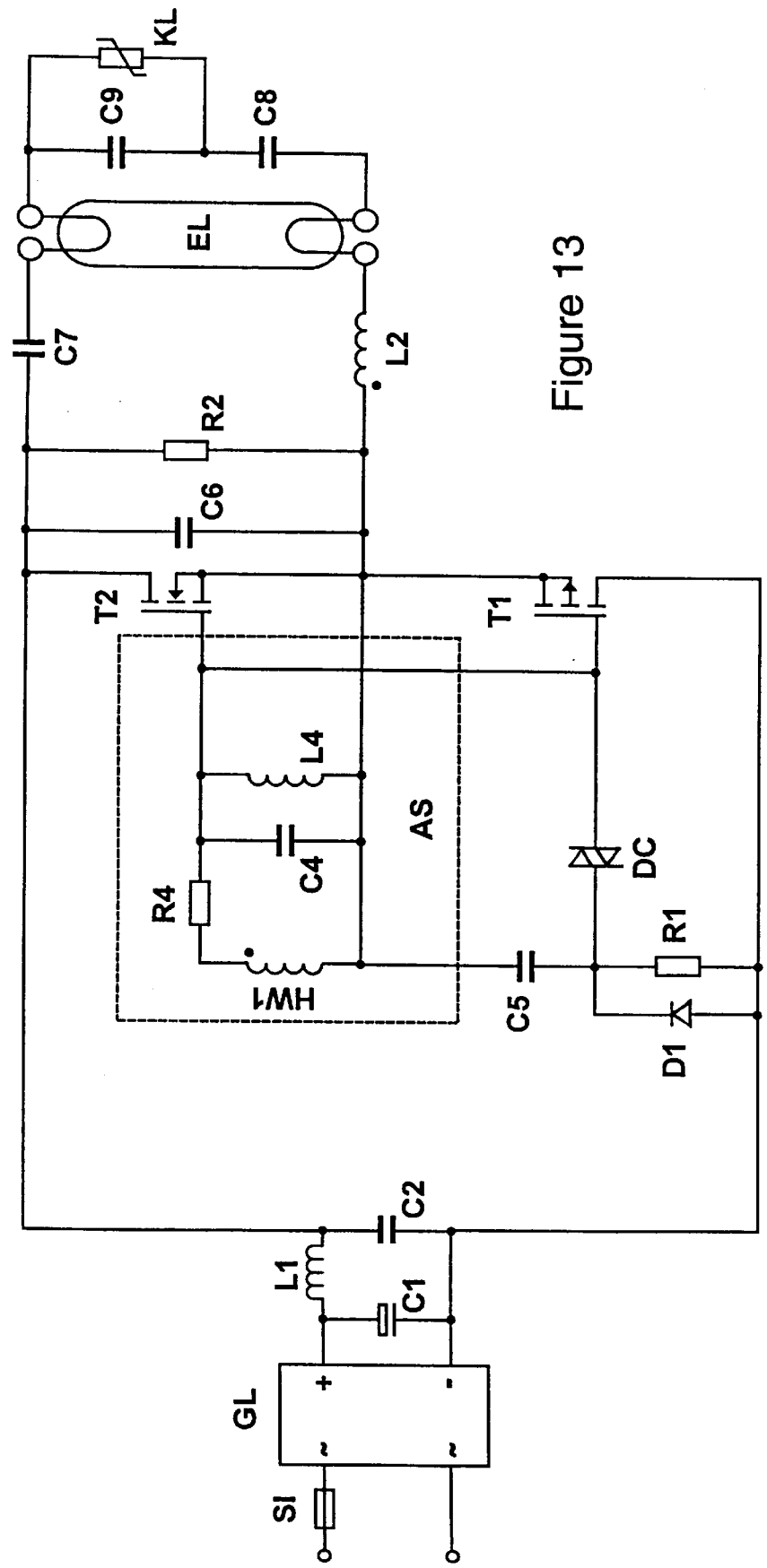

A particularly inexpensive drive circuit AS is represented in FIG. 13. By virtue of the use of two mutually complementary switching elements (i.e.: T1 is a p-channel MOSFET and T2 is an n-channel MOSFET) it is sufficient to produce a common drive voltage for both switching transistors. The switching element T2 is activated by the positive half-cycle of the drive voltage of the LC parallel tuned circuit, and the switching element T2 is activated by the negative half-cycle. A dead time (both switching elements switched off) is automatically provided by the fact that both switching elements are switched off for drive voltage values whose magnitude is less than the threshold voltage of the switching elements.

Figure 11:
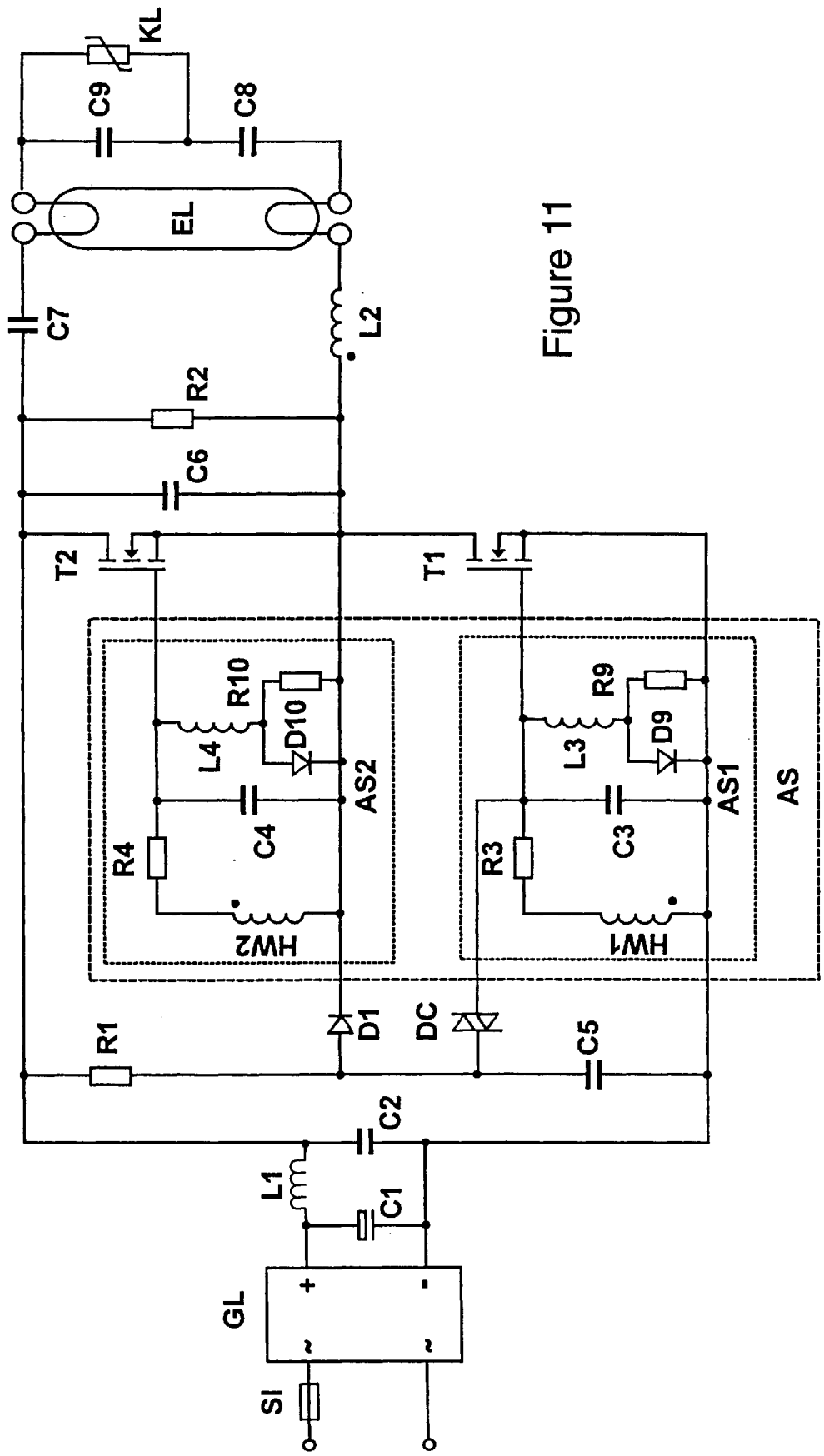

Whereas, in the circuit arrangement according to the invention in accordance with FIG. 5, a temporal stretching of the negative half-cycle of the drive voltage of the LC parallel tuned circuit is achieved, in contrast thereto it is possible with the circuit arrangement according to the invention in accordance with FIG. 11 to achieve a DC voltage offset of the drive voltage of the LC parallel tuned circuit, so that the amplitude of the positive half-oscillation is less than that of the negative one.

In the embodiment according to FIG. 11, a parallel circuit consisting of a diode D9/D10 and a resistor R9/R10 is connected in series with the inductor L3, L4 of the LC parallel tuned circuit in such a way that the cathode of the diode D9/D10 and one terminal of the resistor R9/R10 are connected to the reference potential of the control input of the switching element T1, T2. The anode of the diode D9/D10 and the other terminal of the resistor R9/R10 are connected to the inductor L3, L4 of the LC parallel tuned circuit.

As an alternative to this, the anode of the diode D9/D10 and one terminal of the resistor R9/R10 are connected to the control input of the switching element T1, T2, and the cathode of the diode D9/D10 and the other terminal of the resistor (R9/R10) are connected to the inductor L3, L4 of the LC parallel tuned circuit.

This achieves a negative DC voltage offset $\overline{U}$ (T1, gate), $\overline{U}$ (T2), gate)) [sic], adjustable through the resistance of the resistor R9, R10, in the output voltage of the LC parallel tuned circuit relative to the control input of the switching element T1, T2, and thereby a shortening of the positive pulse width, for equal period, which leads to activation of the switching element.

Figure 16A:
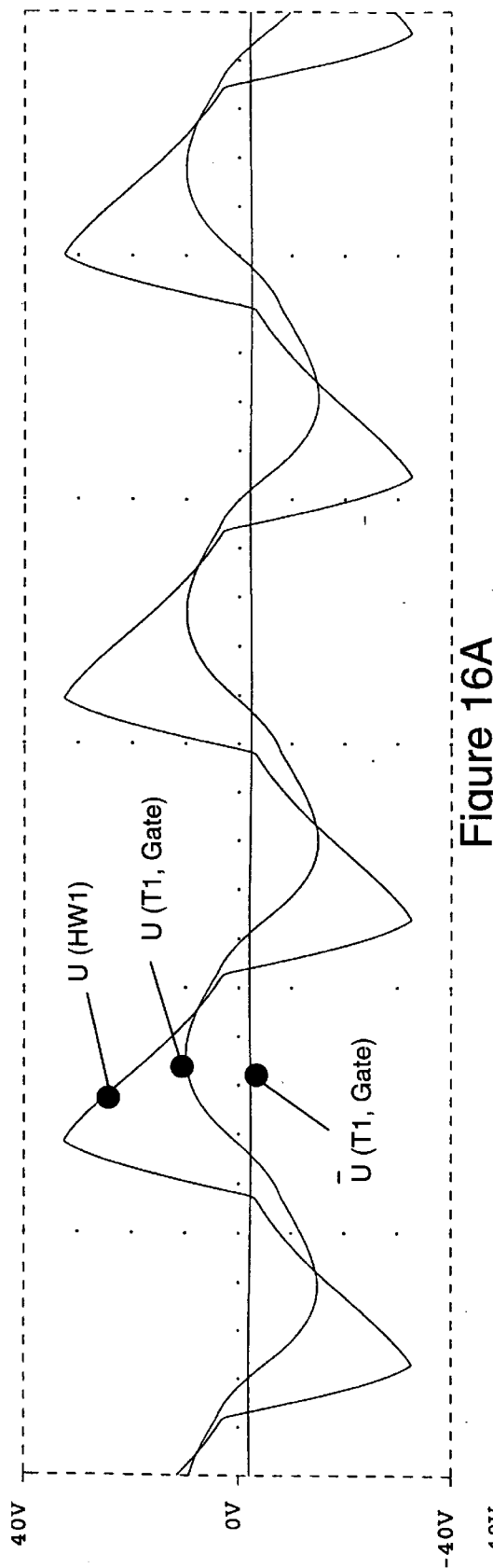
FIGS. 16A, 16B show voltage waveforms as a function of time for the circuit arrangement in FIG. 11.
Figure 16B:
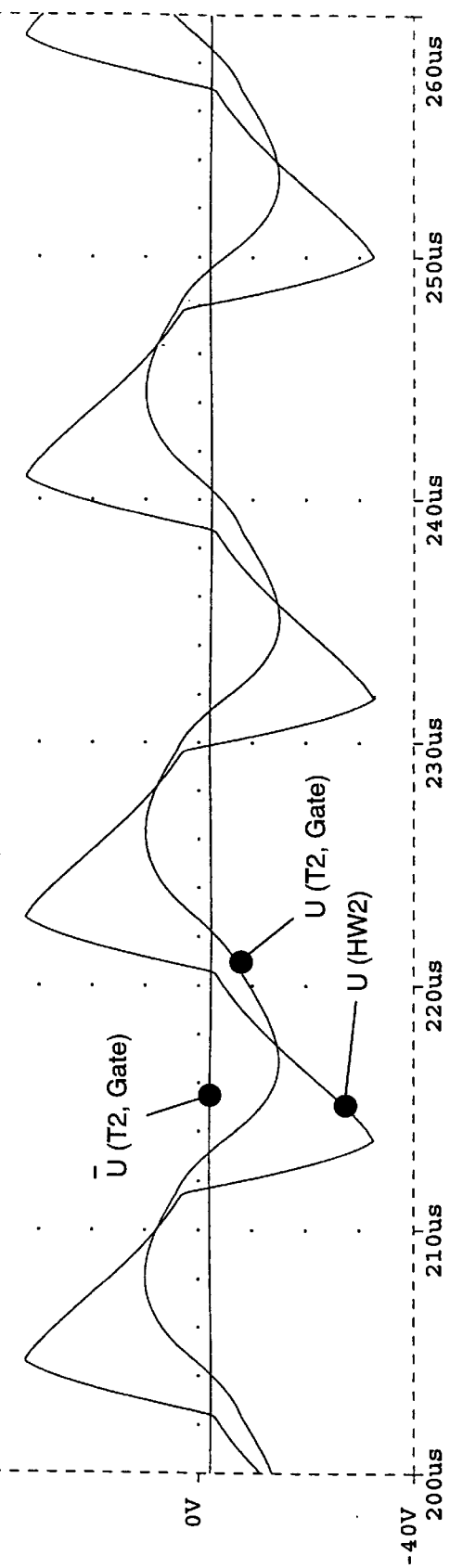

FIG. 16 shown the relevant voltage waveforms as a function of time for the circuit arrangement represented in FIG. 11. In this came, FIG. 16a shows the waveform of U(T1, gate), $\overline{U}$ (T1, gate) and U(HW1), and FIG. 16b shows the waveform of U(T2, gate), $\overline{U}$ (T2, gate). $\overline{U}$ (T$_x$, gate) denotes the average over time of the drive voltage U (T$_x$, gate) of the switching elements T1, T2). Since, across a coil, it is only possible for a DC voltage to occur which is produced across its ohmic impedance by a current flowing through the coil, the voltage drop across the inductor of thy LC parallel tuned circuit (L3, L4) has the time average U$_L$=0 V. By virtue of the parallel connection of a diode D9/D10, only a negative voltage can occur as the time average across the resistor R9/R10, and, on the basis of Kirchhoff's voltage law, this voltage is compensated for by a DC voltage in the capacitor C3, C4 of the LC parallel tuned circuit, superimposed on the AC voltage U$_c$(t).

On the basis of Kirchhoff's laws, the arrangement of the parallel circuit of R9/R10 and D9/D10 and of the inductor of the LC parallel tuned circuit (L3, L4) within the series circuit is arbitrary.

By virtue of this superimposed DC voltage, a control signal is set up, at the control input of the half-bridge circuit elements, the duty ratio of which is less than 50% relative to a voltage sufficient to switch on the half-bridge switching elements. This is represented in FIG. 16. The time average of the control voltage of the drive circuit parts AS1 and AS2 configured according to FIG. 11 is negative, the amplitude of the positive half-cycles having a smaller magnitude than the amplitude of the negative half-cycles.

Figure 12:
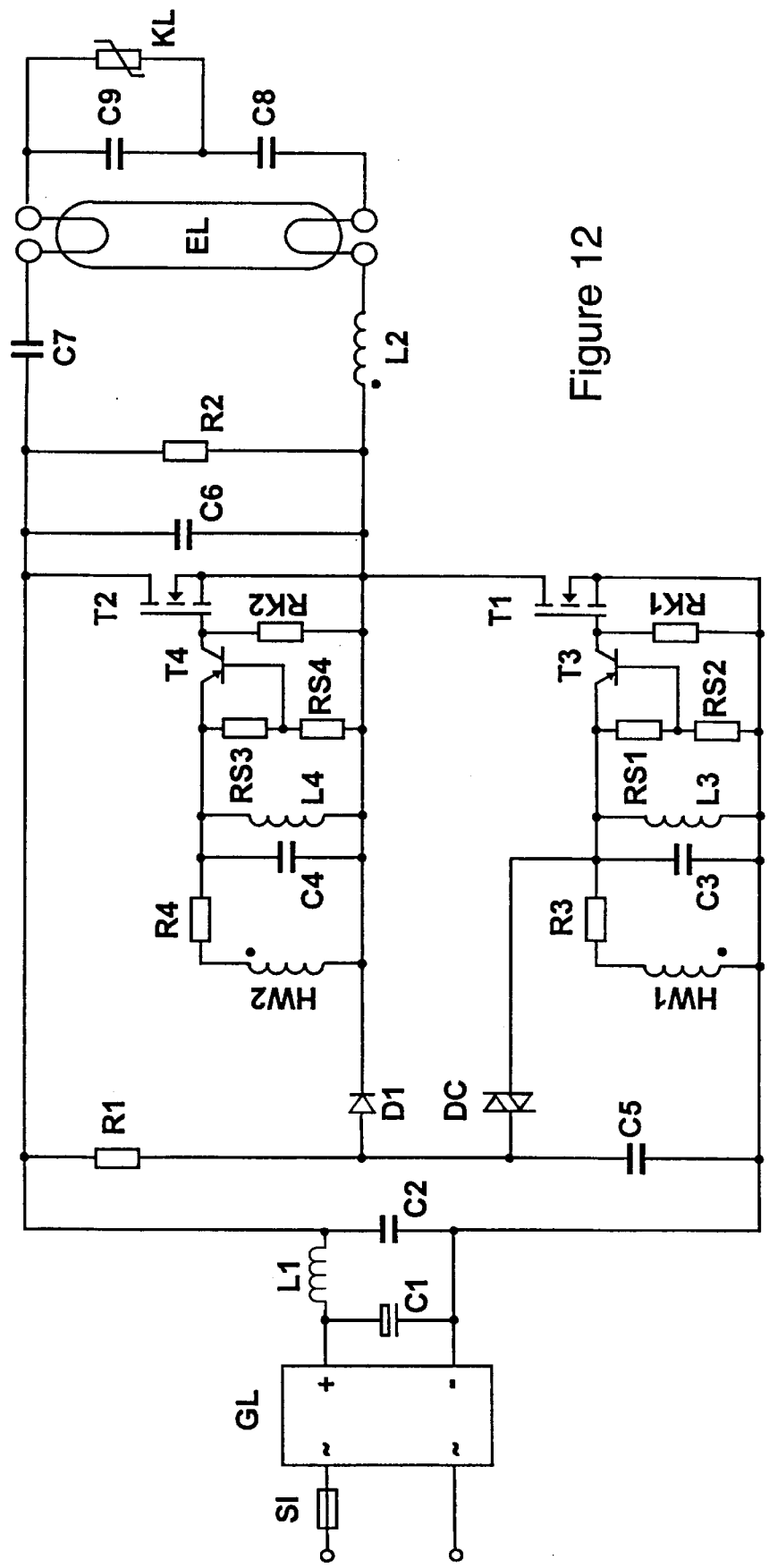

A further circuit arrangement which lengthens the dead time t$_T$ (both t$_T$; half-bridge switching elements T1, T2 switched off), is represented in FIG. 12. The relevant voltage waveforms for a circuit according to FIG. 12 are shown by FIG. 17, FIG. 17a representing U(HW1), U(T1, gate) and U(L3), (T1, gate), while FIG. 17b represents U(HW2), U(T2, gate) and U(L4) (T2, gate).

In the circuit arrangement represented in FIG. 12, a clamping resistor RK1, RK2 is inserted between the control input of a switching element T1, T2 and the reference potential for this control input. In order to lengthen the dead time (t$_T$; T1, T2 switched off), a resistor divider ($R_{S1/S3}/R_{S2/S4}$) and a further switching element T3, T4 are inserted between the control output of the LC parallel tuned circuit and the switching element (T1, T2).

The switching element T3, T4 used is preferably a pnp transistor which is inserted into the control line (gate line) of the switching element T1, T2.

As an alternative to this, the switching element T3, T4 used may be an npn transistor which is inserted into the line of the reference potential of the control input (source) of the switching element T1, T2, in such a way that the collector of T3, T4 is connected to the switching element T1, T2, the emitter to the LC parallel tuned circuit and the base to the centre tap of the voltage divider (RS1,RS2;RS3,RS4).

The drive voltage of the LC parallel tuned circuit is in this case not applied to the switching element T1, T2 until the control voltage, formed by the resistor divider $R_{S1/S3}/R_{S2/S4}$ from the control voltage of the LC parallel tuned circuit, for the switching element T3, T4 exceeds the switch-on threshold (threshold voltage) of T3, T4 and switches them on (FIGS. 12 and 17).

The control transistor T3, T4 is thus connected between the output of the LC parallel tuned circuit and the control input of the half-bridge switching element T1, T2. If the control transistor T3, T4 is off, then the control voltage of the half-bridge switching element T1, T2 is 0 volt. In this case, the resistor $R_{K1}/R_{K2}$ prevents charging of the gate-source capacitance (input capacitor of the switching element T1, T2) and thus unintentional switching-on of the half-bridge switching element T1, T2 due to extraneous influences.

If the drive voltage of the LC parallel tuned circuit then increases, then the voltage drop across the resistor divider $R_{S1/S3}/R_{S2/S4}$ also increases. By selection of the ratio $R_{S1/S3}$ to $R_{S2/S4}$, it is then possible to set the output voltage of the LC parallel tuned circuit at which the voltage drop across the control resistor $R_{S1/S3}$ becomes large enough to switch on the control transistor T3, T4. At this operating point, the voltage across $R_{S1\ or\ RS3}$ must be just as great as the threshold voltage of the control transistor T3, T4 (about 0.6 volt in the case of a small-signal bipolar transistor).

The further-increasing output voltage of the LC parallel tuned circuit is then forwarded via the switch-on control transistor T3, T4 to the control input of the half-bridge switching element T1, T2 albeit less the forward voltage of the control transistor T3, T4. This leads to switching-on of the half-bridge switching element T1, T2. The resistor $R_{K1}/R_{K2}$ is selected to have a resistance high enough to have no significant effect on the control voltage, or to place only comparatively little load on the LC parallel tuned circuit.

The control transistor remains switched on until the voltage across the control resistor $R_{S1}$ or $R_{S3}$ falls back below the threshold voltage and the base-collector diode of the control transistor is fully cleared.

The half-bridge switching element switches off reliably, independently of the clearing phase of the control transistor T3, T4, since the drive voltage of the LC parallel tuned circuit becomes less than the control voltage of the half-bridge switching element T1, T2 required for switching on.

As described above, the control transistor T3, T4 can also be inserted into the line of the reference potential of the control input of the half-bridge circuit element. In this case, the values for the resistor divider $R_{S1/S3}/R_{S2/S4}$ are selected in such a way that the voltage drop across the resistor of the voltage divider, which is connected between the base and emitter of T3/T4, leads to switching-on of the control transistor T3, T4.

FIG. 13 shows a circuit arrangement according to the invention, in which the half-bridge arrangement is formed by two mutually complementary transistors T1, T2. The drive circuit AS is configured in such a way that the LC parallel tuned circuit is connected, on the one hand, to the connection point (half-bridge mid-point) of the two switching elements T1, T2 and, on the other hand, to the two switching-element control inputs which are connected together. In this embodiment, one LC parallel tuned circuit is sufficient for driving both switching elements T1, T2 of the half-bridge, a further switching element, for example a transformer, not being required.

The circuit arrangements described above are preferably equipped with a half-bridge arrangement, although other common free-running invertors, for example asymmetric half-bridge, full-bridge, push-pull or even single-transistor converters, may be employed.

The circuit elements for a circuit arrangement according to FIG. 1 for operating a lamp with a power consumption of 20 watts from a 230 volt AC network are compiled below:

| | |
|---|---|
| SI | ELDUR:KPSO 3/46 |
| GL | 1 A, 600 V |
| C1 | 10 μF, 350 V electrolytic capacitor |
| C2 | 220 nF, 350 V, MKT |
| C3/C4 | 3.3 nF, 63 V, MKT |
| C5 | 100 nF, 63 V, MKT |
| C6 | 1 nF, 630 V, MKP |
| C7 | 47 nF, 350 V, MKT |
| C8 | 10 nF, 500 V, MKT |
| C9 | 4.7 nF, 630 V, MKT |
| L1 | rod-core coil 1.5 mH |
| L2, HW1, HW2 | $L_{prim}$ = 2.6 mH; $n_{prim}$ = 240.5; $n_{HW1/2}$ = 18; EF16 |
| L3/L4 | rod-core coil 4.7 mH |
| R1 | 470 kΩ, 0.6 W |
| R2 | 470 kΩ, 0.6 W |
| R3/R4 | 2.2 kΩ, 0.6 W |
| KL | Siemens PTC S1380 |
| T1/T2 | FET 500 V, 6Ω; SSU1N50, STK2N50 |
| D1 | 1N4004, 1N4005, 1N4006, 1N4007 |
| DC | Diac DB3N (SGS-Thomson) |

We claim:

1. A circuit arrangement for operating a lamp (EL), in particular a low-pressure discharge lamp, with a load circuit which has at least one inductor (L2) and at least one capacitor (C7, C8, C9), and with an inverter which may be configured as a half-bridge arrangement with two switching elements (T1, T2) and with a drive circuit (AS) for driving the switching elements (T1, T2), characterized in that the drive circuit (AS) consists of circuit parts (AS1 AS2) specific to the switching elements each of the circuit parts (AS1, AS2) having an LC parallel tuned circuit (L3C3, L4C4), an auxiliary winding (HW1, HW2) and a resistor (R3, R4) connecting a respective LC parallel tuned circuit to a respective auxiliary winding, the natural resonant frequency of the LC parallel tuned circuits (L3C3, L4C4) of each circuit part (AS1, AS2) specific to the switching elements is the same.

2. The circuit arrangement according to claim 1, characterized in that the inductor (L2) of the load circuit has a magnetic circuit with incorporated air gap, and the inductor (L3, L4) of LC parallel tuned circuit is configured with an external air gap or as an air-core inductor.

3. The circuit arrangement according to claim 1, characterized in that the LC parallel tuned circuit (L3C3, L4C4) of each circuit part (AS1, AS2) specific to the switching part have identical inductors (L3, L4) and identical capacitors (C3, C4), respectively.

4. A circuit arrangement for operating a lamp (EL), in particular a low-pressure discharge lamp, with a load circuit which has at least one inductor (L2) and at least one capacitor (C7, C8, C9), and with an inverter which may be configured as a half-bridge arrangement with two switching elements (T1, T2) and with a drive circuit (AS) for driving the switching elements (T1, T2), characterized in that the drive circuit (AS) has a LC parallel tuned circuit (L3C3, L4C4), an auxiliary winding (HW1, HW2) and a resistor (R3, R4) connecting the LC parallel tuned circuit to the auxiliary winding, the two switching elements (T1, T2) of the half-bridge arrangement are formed from two mutually complementary transistors, and in that the drive circuit (AS) is configured in such a way that the LC parallel tuned circuit is connected, on the one hand, to a connection point of the two switching elements (T1, T2) and, on the other hand, to the two control inputs of the switching elements (T1, T2) which are connected together.

5. The circuit arrangement according to claim 4, characterized in that the drive circuit (AS) has a further switching element (TR) which inverts a drive signal formed by the LC parallel tuned circuit, and in that the drive circuit is furthermore configured in such a way that the drive signal of the LC parallel tuned circuit is fed to one switching element (T1) and the inverted drive signal of the LC parallel tuned circuit is fed to the other switching element (T2), respectively.

6. The circuit arrangement according to claim 4, characterized in that the drive circuit (AS) has a further circuit part TR which produces at a first output a drive signal formed by the LC parallel tuned circuit in inverted form, and at a second output the drive signal of the LC parallel tuned circuit in non-inverted form, and in that the drive circuit (AS) is furthermore configured in such a way that the control input of one switching element (T2) is connected to the first output of the switching element (TR), and the control input of the other switching element (T1) is connected to the second output of the switching element (TR).

7. The circuit arrangement according to claim 5, characterized in that the further switching element (TR) is a transformer.

8. The circuit arrangement according to claim 7, characterized in that the transformer has one or more secondary windings, and in that each secondary winding is assigned to at least one switching element (T1, T2) of the invertor.

9. The circuit arrangement according to claim 1, characterized in that the resistor (R3, R4) is linear.

10. The circuit arrangement according to claim 1, characterized in that a series circuit consisting of a diode (D3, D4) and a resistor (R5, R6) is connected in parallel with each LC parallel tuned circuit in such a way that the half-cycle of each LC parallel tuned circuit during which the control voltage at the control input of a switching element (T1, T2) of the invertor is negative is more strongly damped so that a dead time ($t_T$) of the half-bridge (T1, T2 switched off) is extended.

11. The circuit arrangement according to claim 1, characterized in that, between each LC parallel tuned circuit and one of the switching elements (T1, T2) a further resistor (R7, R8) is arranged which, during a charge-transfer phase of a switching load-reduction capacitor (C6) by transfer of the charge of this capacitor (C6), produces a voltage drop which counteracts the drive voltage of each LC parallel tuned circuit so that switching-on of the switching elements (T1, T2) during the transfer of the charge of the switching load-reduction capacitor (C6) is prevented.

12. The circuit arrangement according to claim 11, characterized in that a diode (D7, D8) is connected in parallel with the further resistor (R7, R8) in such a way that its anode is connected to a terminal of each LC parallel tuned circuit which is not connected to the control input of one of the switching elements (T1, T2) and that its cathode is connected to a reference potential of one of the switching element (T1, T2).

13. The circuit arrangement according to claim 1, characterized in that, between the control input of one of the switching elements and the corresponding LC parallel tuned circuit, a pulse-shaping and impedance-converting quadripole (VP) is connected in which accelerates the switching-off of one of the switching elements.

14. The circuit arrangement according to claim 1, characterized in that a voltage-dependent damping component (DG) is arranged in parallel with each LC parallel tuned circuit.

15. The circuit arrangement according to claim 1, characterized in that a series circuit consisting of a Zener diode (ZD) and a resistor (RZ) which is connected to the anode of the Zener diode is connected in parallel with each LC parallel tuned circuit, and in that the control input of one of the switching elements (T1, T2) is connected to the anode of the Zener diode and a reference potential of one of the switching elements (T1, T2) is connected to a connection point between the resistor (RZ) and each LC parallel tuned circuit.

16. The circuit arrangement according to claim 1, characterized in that, in series with the inductor (L3, L4) of each LC parallel tuned circuit, a parallel circuit consisting of a diode (D9/D10) and a resistor (R9/R10) is arranged in such a way that the cathode of the diode (D9/D10) and a terminal of the resistor (R9/R10) are connected to a reference potential of the control input of a switching element (T1, T2), and that the anode of the diode (D9/D10) and the other terminal of the resistor (R9/R10) are connected to the inductor (L3, L4) of each LC parallel tuned circuit, as a result of which a negative DC voltage offset, adjustable through the resistance of the resistor (R9/R10), is achieved in the drive voltage of the LC parallel tuned circuit relative to the control input of the switching element (T1, T2).

17. The circuit arrangement according to claim 1, characterized in that a clamping resistor (RK1, RK2) is inserted between the control input of one of the switching elements and a reference potential for this control input, and in that, in order to extend the dead time ($t_T$; T1, T2 switched off), a resistor divider (RS1, RS2, RS3, RS4) and further switching elements (T3, T4) are inserted between the control output of each LC parallel tuned circuit and one of the switching elements (T1, T2), which switching element only applies the drive voltage of the LC parallel tuned circuit to the switching element if the control voltage, formed by the resistor divider (RS1, RS2, RS3, RS4) from the drive voltage of each LC parallel tuned circuit, for this further switching element (T3, T4) exceeds a threshold voltage of the latter and switches it on.

18. The circuit arrangement according to claim 17, characterized in that the threshold voltage of the switching elements (T1, T2) can be predetermined in such a way that a predeterminable on-time of the switching elements can be produced.

19. A circuit arrangement for operating a lamp (EL), in particular a low-pressure discharge lamp, with a load circuit which has at least one inductor (L2) and at least one capacitor (C7, C8, C9), and with an inverter which may be configured as a half-bridge arrangement with two switching elements (T1, T2) and with a drive circuit (AS) for driving the switching elements (T1, T2), characterized in that the drive circuit (AS) has at least one LC parallel tuned circuit (L3C3, L4C4) including an inductor (L3, L4) and a resistor (R13, R14) in parallel with the LC parallel tuned circuit, the LC tuned circuit being only magnetically coupled to the inductor (L2) of the load circuit.

20. The circuit arrangement according to claim 1, characterized in that the resistor (R3,R4) is non-linear.

21. The circuit arrangement according to claim 1, characterized in that the resistor (R3,R4) is temperature-dependent.

* * * * *